Nov. 4, 1952   J. W. DEHN   2,616,974
REGISTER CONTROL OF COIN RETURN
Filed Oct. 29, 1948   13 Sheets-Sheet 1

INVENTOR
J. W. DEHN
BY P. C. Smith
ATTORNEY

Nov. 4, 1952    J. W. DEHN    2,616,974
REGISTER CONTROL OF COIN RETURN
Filed Oct. 29, 1948    13 Sheets-Sheet 9

INVENTOR
J. W. DEHN
BY P. C. Smith
ATTORNEY

Nov. 4, 1952                J. W. DEHN                2,616,974

REGISTER CONTROL OF COIN RETURN

Filed Oct. 29, 1948                            13 Sheets-Sheet 11

FIG. 11

INVENTOR
J. W. DEHN
BY
P. C. Smith
ATTORNEY

Nov. 4, 1952　　　　　J. W. DEHN　　　　　2,616,974
REGISTER CONTROL OF COIN RETURN
Filed Oct. 29, 1948　　　　　　　　　　13 Sheets-Sheet 13

INVENTOR
J. W. DEHN
BY P. C. Smith
ATTORNEY

Patented Nov. 4, 1952

2,616,974

UNITED STATES PATENT OFFICE 2,616,974

REGISTER CONTROL OF COIN RETURN

Joseph W. Dehn, Great Neck, N. Y., assignor to Bell Telephone Laboratories, Incorporated, New York, N. Y., a corporation of New York Application October 29, 1948, Serial No. 57,398

25 Claims. (Cl. 179—6.3)

1

This invention relates to telephone systems in which connections between subscriber lines are established by automatic switching equipment and more particularly to a register circuit which is arranged to test for a coin deposited in the coin box of a pay station line to initiate a call and to return such coin if the subscriber dials the connection to an operator's position or dials the connection to a line for which free service should be given.

The invention is specifically applicable to a system of the cross bar type such as is disclosed in Patent No. 2,585,904 granted to A. J. Busch, February 19, 1952.

In a system of this type when a subscriber originates a call, a marker is associated with his line over a marker-connector and in responding to the call establishes a connection from the calling line through the primary and secondary cross bar switches of the line-link frame on which the calling line terminates and the primary and secondary switches of a trunk-link frame to an idle dial pulse originating register circuit. Each register has a tip, ring and sleeve appearance on a trunk-link frame just as a trunk does and the operation of selecting a register and connecting a calling line to it is the same as selecting a trunk and connecting a line to it. These selecting functions, as carried out by the marker, have been described in Patent 2,573,569 to R. E. Hersey granted October 30, 1951. This connection between the calling line and register is called the dial tone connection and gets its name from the fact that dial tone is supplied to the calling line over this connection when the register is ready to receive dial pulses.

While the marker is in the process of establishing this dial tone connection, it records certain information concerning the calling line on memory relays in the register because the marker which sets up the originating connection from the calling line to a trunk will need this information. This information is passed to the register by way of the trunk-link and connector circuits. This data consists of the class of the calling line, its location on the line switches of the line-link frame and the line link used in the dial tone connection. At the same time the marker informs the register if the calling line is a coin line, as will be assumed in the present case, a two-party message rate line or a manual line. In each of these cases the register is required to take action peculiar to that type of call.

It is the object of the present invention to provide facilities in the register to take action with respect to calls originating on lines of the coin box type.

To attain this object the register, after being informed by the marker that the call on which it has been seized is from a coin box line, proceeds to transmit a dial tone to the calling line. After the subscriber has dialed the digits of the desired connection, the register proceeds to make a coin test, except on calls to a zero operator, in which case a coin may not be deposited. If the coin has been deposited, the register will engage a marker and the call will be completed.

If ten pulses are dialed for the first digit and registered by the A digit register, a relay will be operated indicative of the fact that the subscriber has dialed for a connection to a zero operator and that no further dialing should be expected. If a first digit is dialed followed by a second digit 1 and a third digit 1 commonly known as an X11 code for a connection to a service operator, the register will cause a marker to be called in on the connection. If a 11X code is called, that is two preliminary pulses followed by a series of digit impulses, the register will recognize the code as a call to a service operator or as a directing code and will call in a marker. In all of these cases the register will recognize that further dialing is not to be expected. On zero operator, X11 and 11X calls the originating register returns the coin before calling in the marker.

When dialing is completed and the register has engaged a marker, the marker is informed that the call is of the coin class and the marker then proceeds to establish a connection between the subscriber line and a trunk arranged for coin operation. Such a trunk may be arranged to serve calls of only the coin class or it may be a universal trunk which is arranged for flat rate, coin and automatic message accounting service.

The register may also return the coin when directed to do so by the marker. Such a call would be one to a free code whose trunks are not arranged for coin operation, other than X11 service operator calls. Since the register does not recognize the need for coin return from the office code it engages a marker in the normal manner. The marker determines from the office code that the subscriber should not be charged, requests the register to make coin return and then releases. The register makes coin return and reengages a marker for the completion of the call. If the call is abandoned before the register calls in a marker the register returns the coin.

If the call is abandoned after the register engages the marker for establishing a talking connection with a trunk, but before the charge condition has been set, coin return is accomplished by the trunk circuit connecting itself to a coin supervisory circuit through a coin supervisory link.

If a permanent signal condition arises the deposited coin is returned before the marker is called in to establish a connection to a permanent signal trunk.

The general features of the invention having now been set forth, it is believed that a clearer comprehension of the invention may be secured from the following detailed description when read in connection with the accompanying drawing, in which:

Figs. 1 to 9, inclusive, and Figs. 11 and 12 show portions of a dial pulse originating register, Fig. 10 shows portions of a marker-connector and a marker, Fig. 13 shows schematically a subscriber line of the coin box type, a line-link frame on which the subscriber line appears, a line-link connector, a trunk-link frame on which an originating sender terminates, a trunk-link connector and line-link-marker connector, and Fig. 14 is a diagram showing how the other figures of the drawing should be arranged for a complete disclosure of the invention.

Of the figures of the drawing above enumerated which disclose the originating register, Fig. 1 shows the coin test relays and related circuits;

Figure 6:
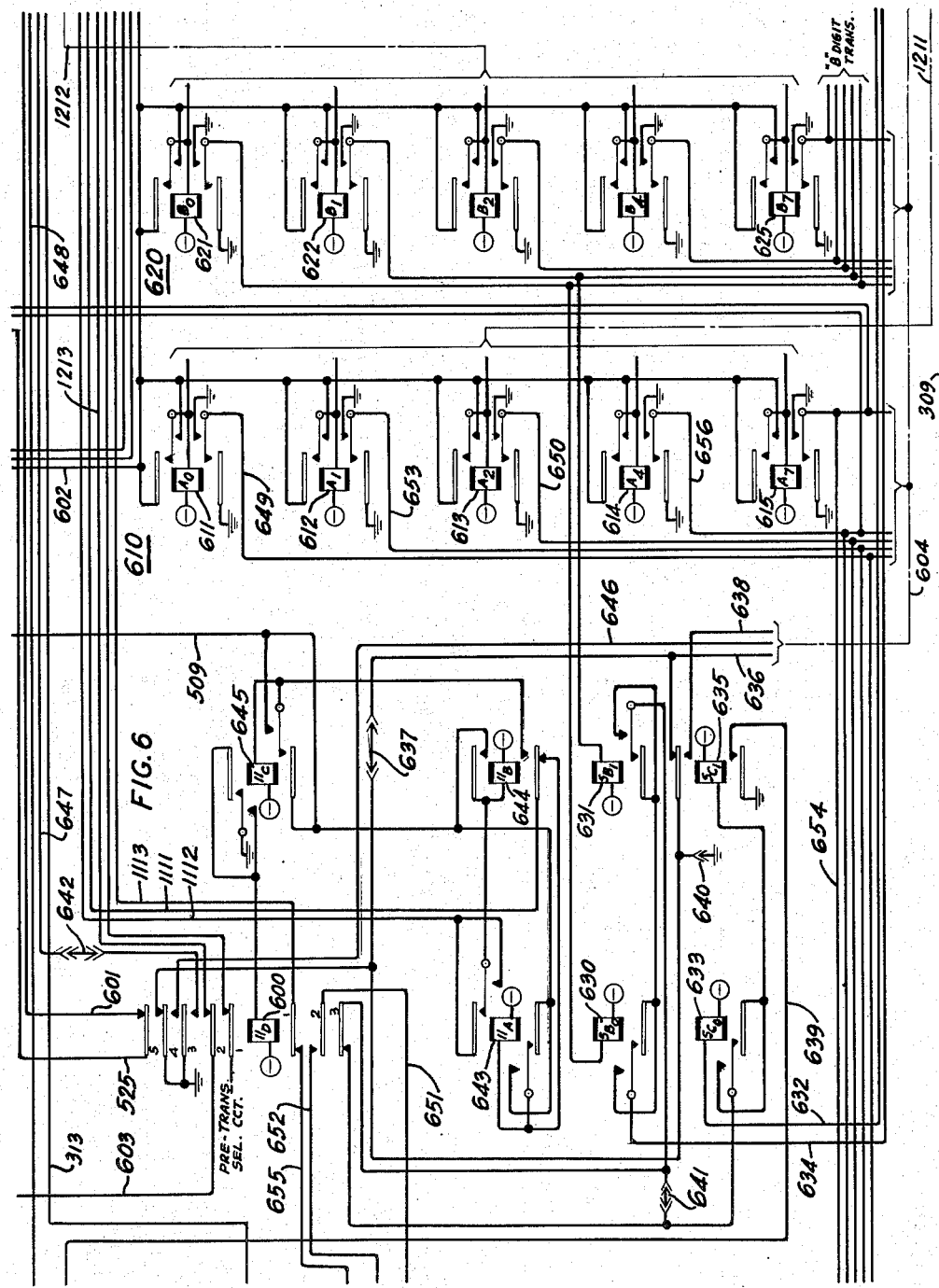
Figure 7:
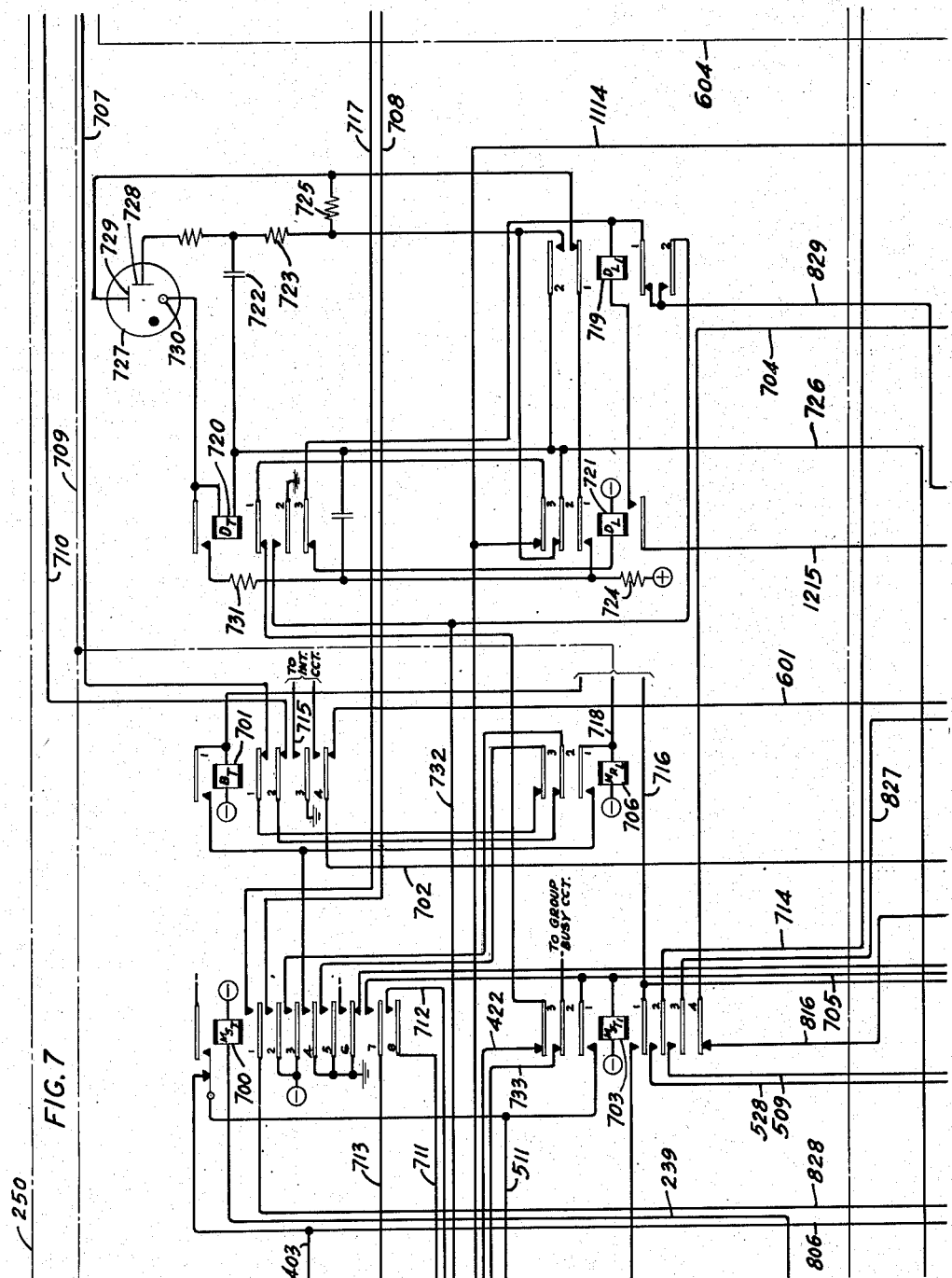
Figure 8:
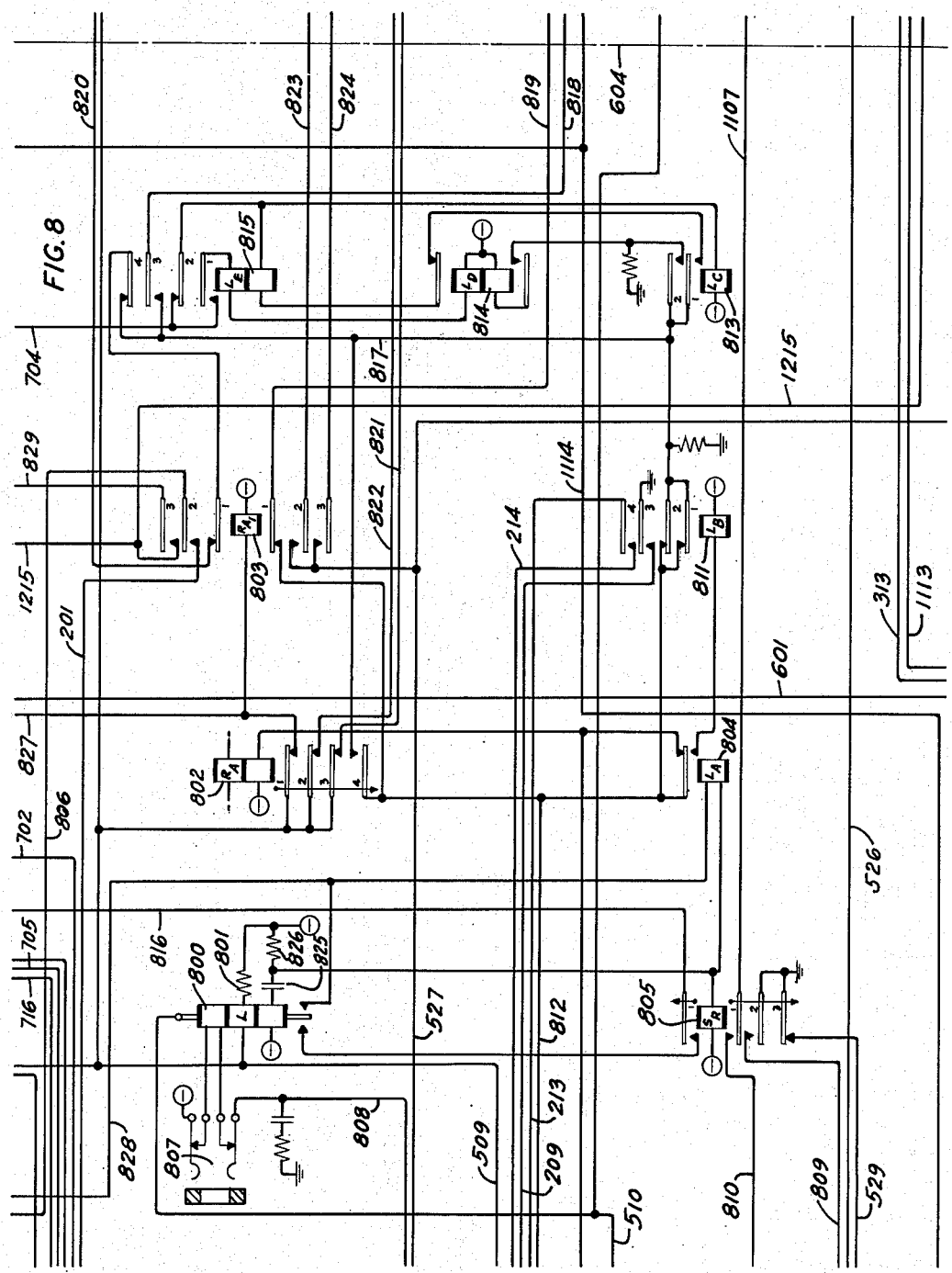
Figure 9:
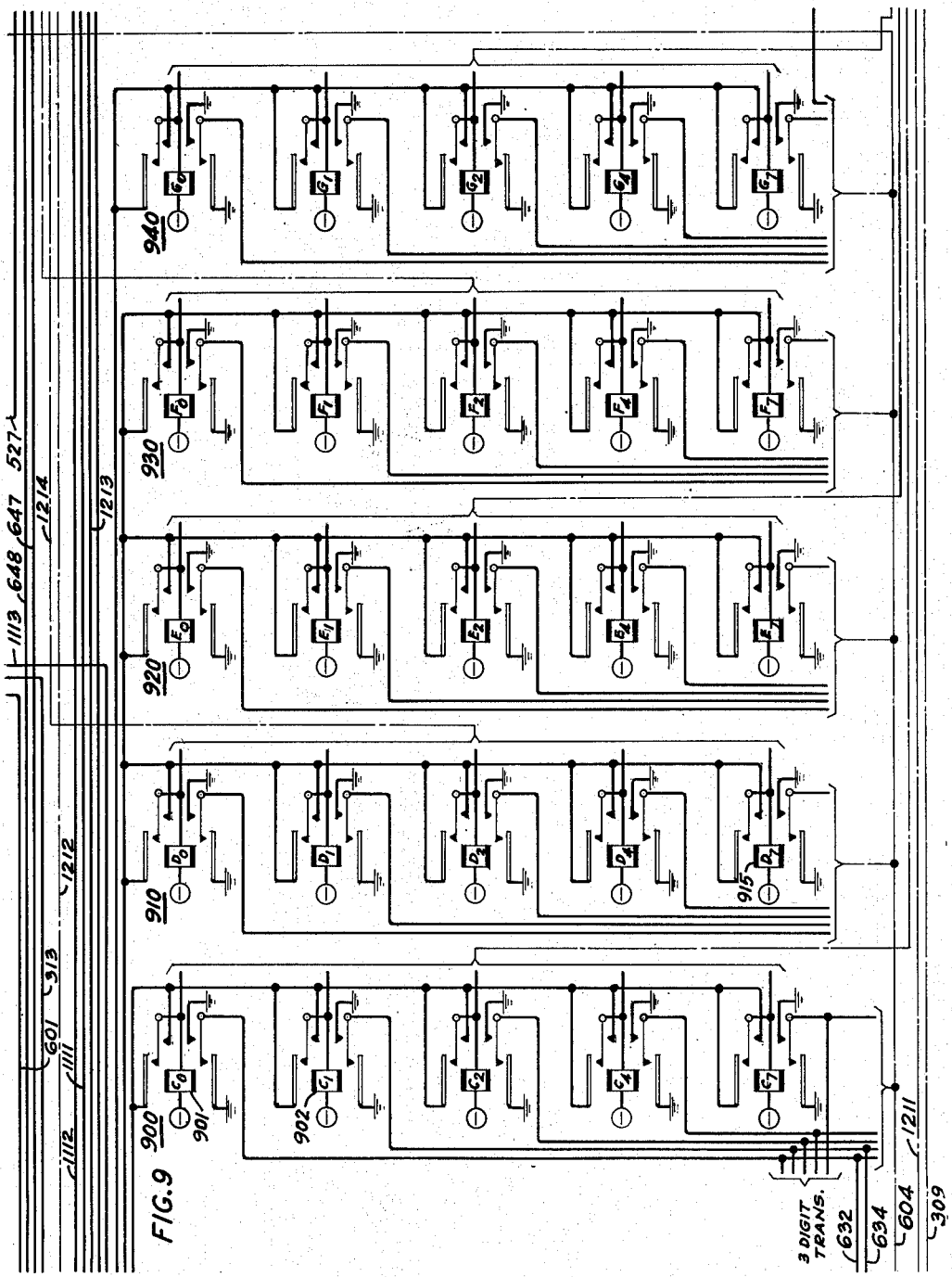

Fig. 6 in the left portion thereof shows the prefix counter and X11 code relays and in the right portion thereof two of the dial pulse registers;

Fig. 7 shows in the right portion thereof the delay timing circuit and in the left portion thereof the marker selection circuit;

Fig. 8 shows in the right portion thereof a part of the dial pulse counting circuits and in the left portion thereof the remainder of the register control relays and circuits;

Fig. 9 shows others of the dial pulse registers;

Fig. 11 shows the remainder of the dial pulse counting circuit; and

Figure 12:
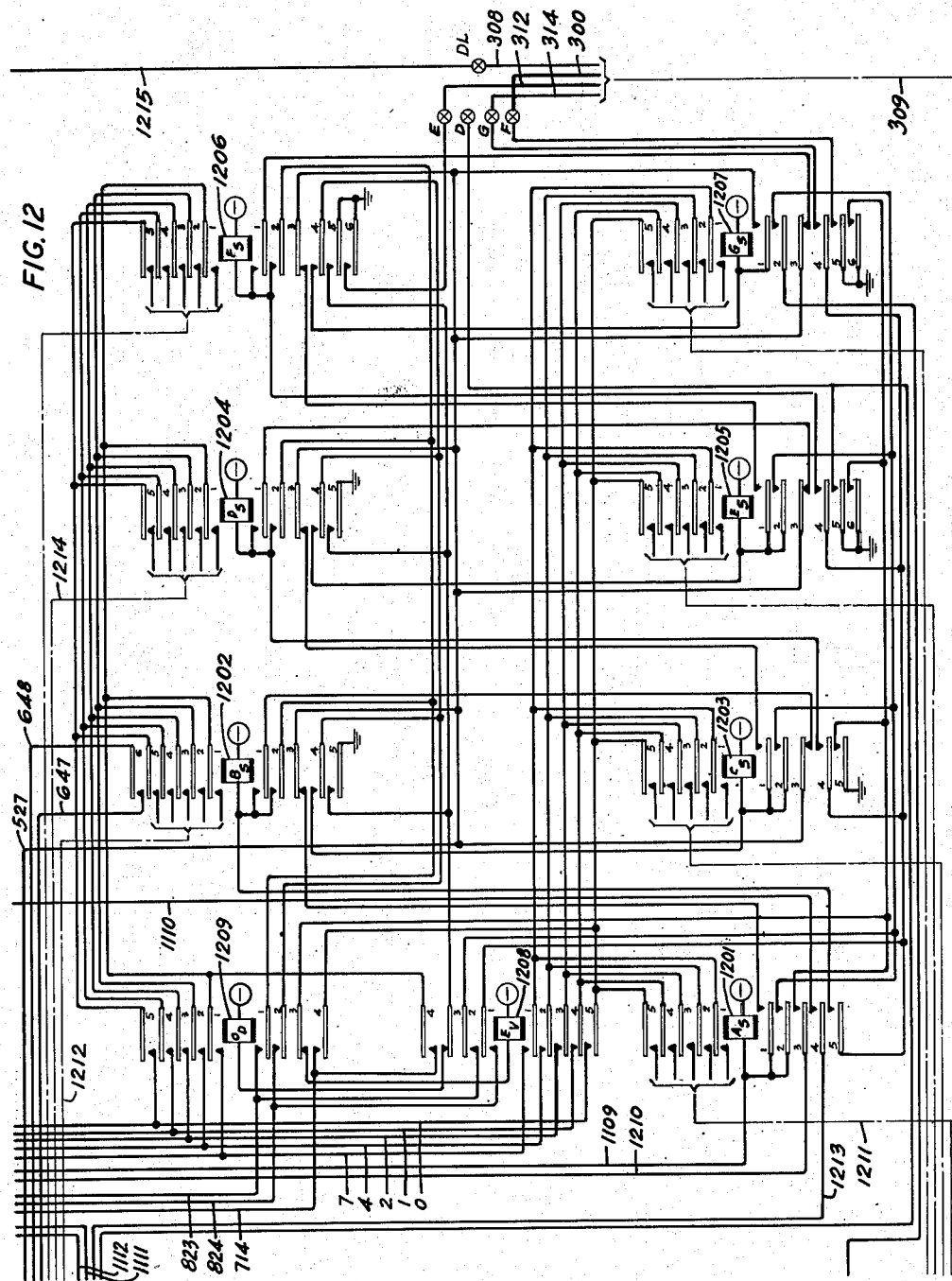
Figure 13:
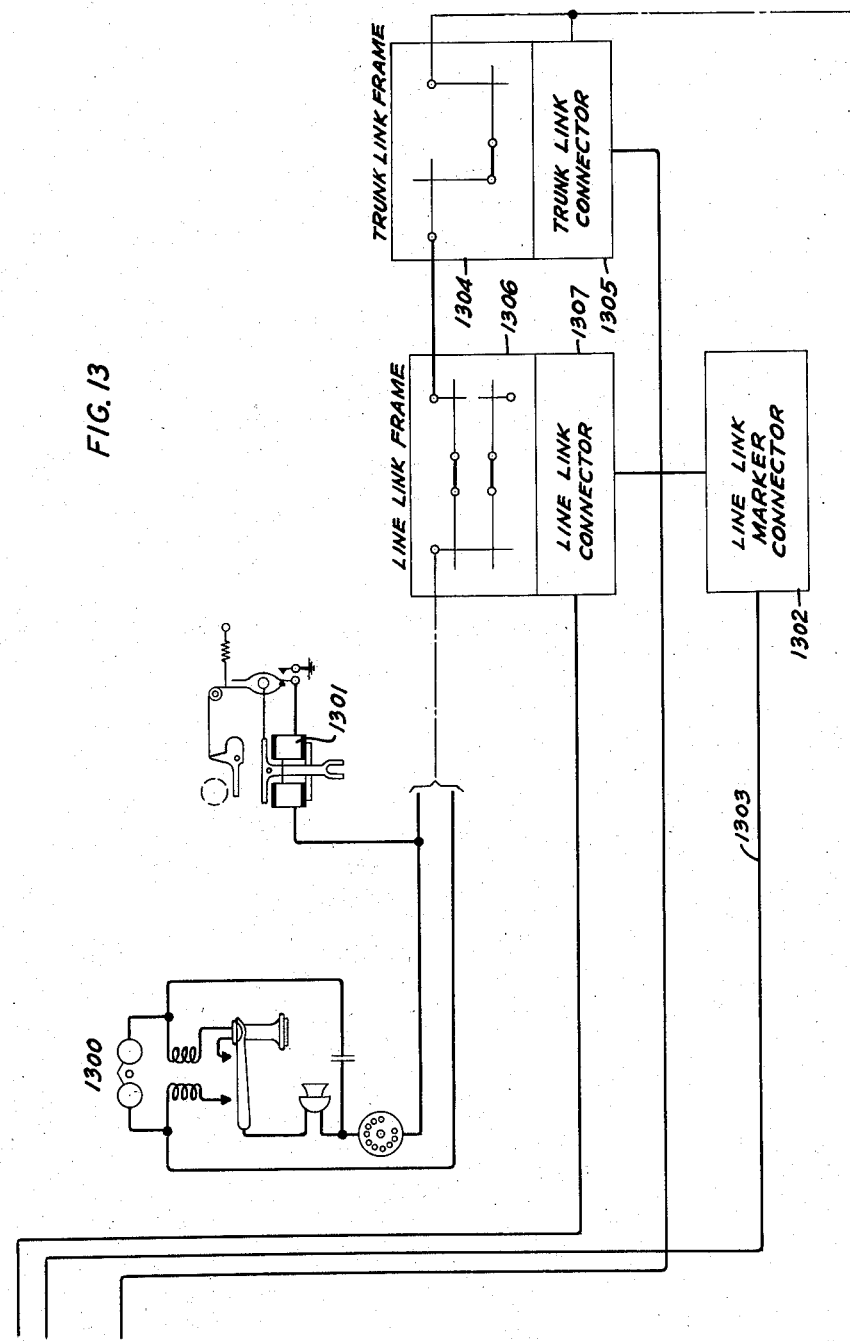

Fig. 12 shows additional relays and circuits of the dial pulse registers.

The circuits and apparatus schematically indicated in the drawings are fully disclosed and described in the patent to A. J. Busch, hereinbefore referred to and such portions of said patent as are of assistance in the comprehension of the present invention are to be considered as incorporated herein, by reference, to the same extent as though set forth in detail.

Figure 10:
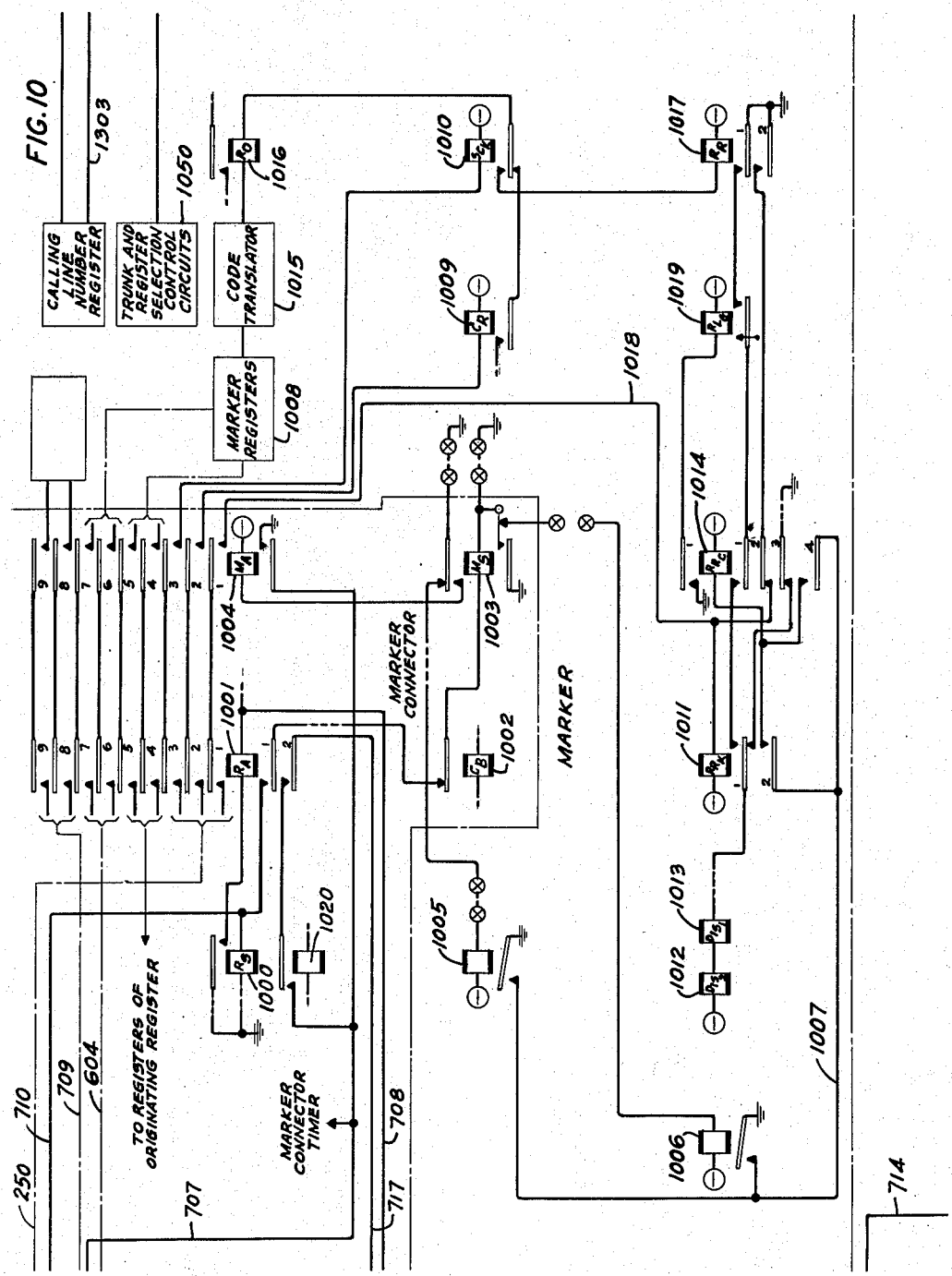

The invention having been set forth in a general manner will now be considered in detail. It will be assumed that the subscriber at the substation 1300 of a coin box line initiates a call by removing his receiver from the switchbook whereupon a connection is established from the line-link frame on which the calling line terminates to an idle marker, for example the marker disclosed in part in Fig. 10. Access to the marker is gained through the line-link marker connector 1302 which connects only such leads over cable 1303 as are necessary to identify the line-link frame to the marker by its frame number and to inform the marker that a dialing connection is to be established. The marker then proceeds through its trunk and register selection control circuits 1050 to select an idle originating register.

Originating registers are distributed over the trunk-link frames. By means of test leads extending from the registers through the trunk-link frames to the marker, the marker determines which trunk-link frames have idle registers and which frames are not being used by other markers. It then preferentially selects an idle frame with idle registers and connects to the frame through the trunk-link connector. The marker then preferentially selects an idle register and connects to it. These selection and connection functions are performed in the manner disclosed in the patent to R. E. Hersey hereinbefore referred to. It will be assumed that the originating register disclosed in part in Figs. 1 to 9, inclusive, and Figs. 11 and 12 is idle and is accessible from the idle trunk-link frame 1304 which is connected to the marker through the trunk-link frame connector 1305.

The location of the calling line is begun as soon as the marker is seized and continues while the marker is selecting an idle register. Line location is made in terms of the line-link frame, the vertical group, the horizontal group and the vertical file. The line-link vertical group of subscribers' lines is five verticals wide and ten switches high. Following marker seizure, the marker determines which vertical group contains the line awaiting service. The vertical group contains a maximum of fifty subscribers' lines, therefore the determination of the vertical group localizes the subscriber line as within fifty of a maximum of six hundred and ninety lines terminating on the frame.

The line-link horizontal group of subscsiber lines is one switch high and the width of the supplied line of switches, the maximum width being that of a frame containing fourteen vertical groups. The marker determines which horizontal group has one or more lines within the selected vertical group awaiting service and the marker then preferentially selects one group. The line to be served has now been located within five lines as determined by the selected vertical and horizontal groups.

Line location does not proceed past the horizontal group selection until the marker has seized the trunk-link frame. Following trunk-link frame seizure the marker seizes the line-link frame 1306 which has identified itself through its marker connector 1302 whereby leads are extended to the marker for vertical file identification and for completing connections to the frame. The line-link vertical file of subscribers' lines is one vertical wide and ten switches high. Thus one vertical group contains five vertical files. The marker tests the five lines found in the vertical group in which the calling line is located and if more than one line are awaiting service the marker preferentially selects one. The marker then transmits the line-link frame number and the selected line location to the originating register.

After the horizontal group has been determined and an originating register seized, the marker selects one of ten channels which may be used to connect the calling line to the register. The marker tests the junctor, line link and trunk link in each channel to see what junctors or links are already in use on other calls. The lowest numbered available channel is chosen and the marker operates the select and hold magnets on the line-link and trunk-link frames to establish the channel. It is assumed that the selected channel extends over the line-link frame 1306 and the trunk-link frame 1304. When the channel is selected the marker indicates to the register the number of the line link used in the channel and the register stores this information for future use.

It will be assumed that the marker has become associated with the originating register disclosed in part herein and that the register is idle as will be indicated by the unoperated condition of the ON relay 500. Therefore, battery at the marker through the winding of a trunk test relay will be applied through the trunk-link frame connector to conductor 501 and ground will be applied through the connector to conductor 502 thereby completing a circuit from battery on conductor 501 through the winding of the F relay 503, over the upper No. 5 back contact of the ON relay 500, conductor 504, the upper No. 3 normal contacts of the PD relay 420, the upper No. 3 back contact of the TMI relay 421, conductor 505, the upper No. 1 back contact of the MB relay 506 and over conductor 502 to ground at the marker. Relay 503 thereupon operates and locks over its upper No. 1 contact to ground on conductor 502 so that its continued operation is dependent entirely upon the marker, and establishes a circuit from ground at the marker, over conductor 507 and its upper No. 3 contacts through the winding of the SI relay 508 to battery. Relay 508 operates and over its lower No. 3 contacts establishes an obvious circuit for the ON relay 500.

The SI relay 508 at its lower No. 2 contacts and the ON relay 500 at its upper No. 4 contacts connect ground to the off-normal ground conductor 509 thereby establishing a circuit through the middle biasing winding of the L relay 800 and through resistor 801 to battery whereby the armature of this polarized relay is biased against its left contact. The connection of ground to conductor 509 is also effective to establish a circuit over the No. 1 back contact of the RA relay 802 and through the winding of the RAI relay 803 to battery whereupon relay 803 operates. The ON relay 500 also connects ground over its lower No. 3 contacts and conductor 510 to the armature of the L relay 800, but with such armature biased against its left or back contact, the connection of such ground cannot be effective to establish the operating circuit through the winding of the LA relay 804 and the winding of the SR relay 805 which if operated might generate a false pulse.

The ON relay 500 at its upper No. 5 back contact opens the initial operating circuit for the F relay 503 but as previously stated, relay 503 upon operating has locked itself under the control of the marker.

Figure 4:
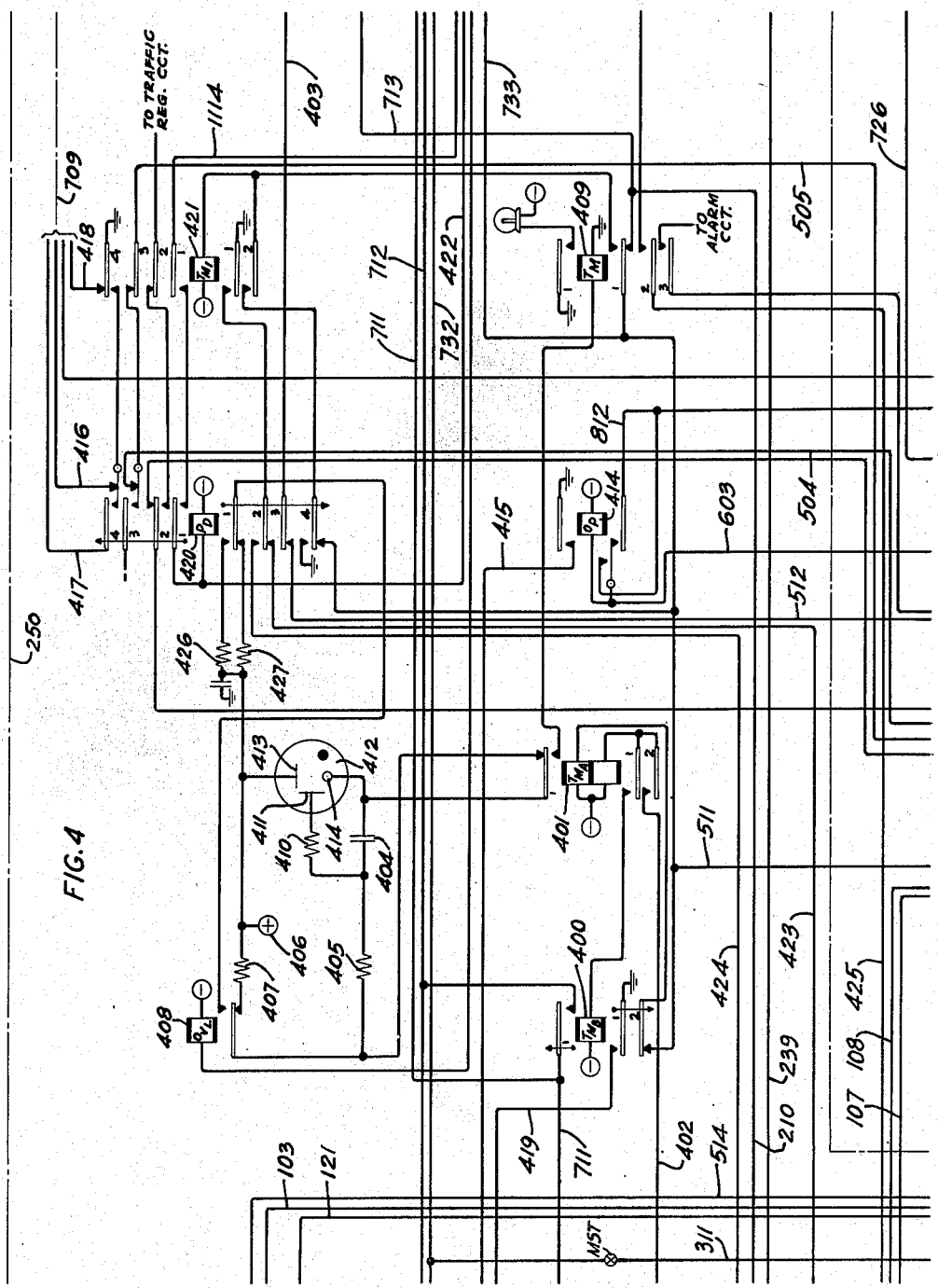
Fig. 4 shows the register timing circuit.
Figure 5:
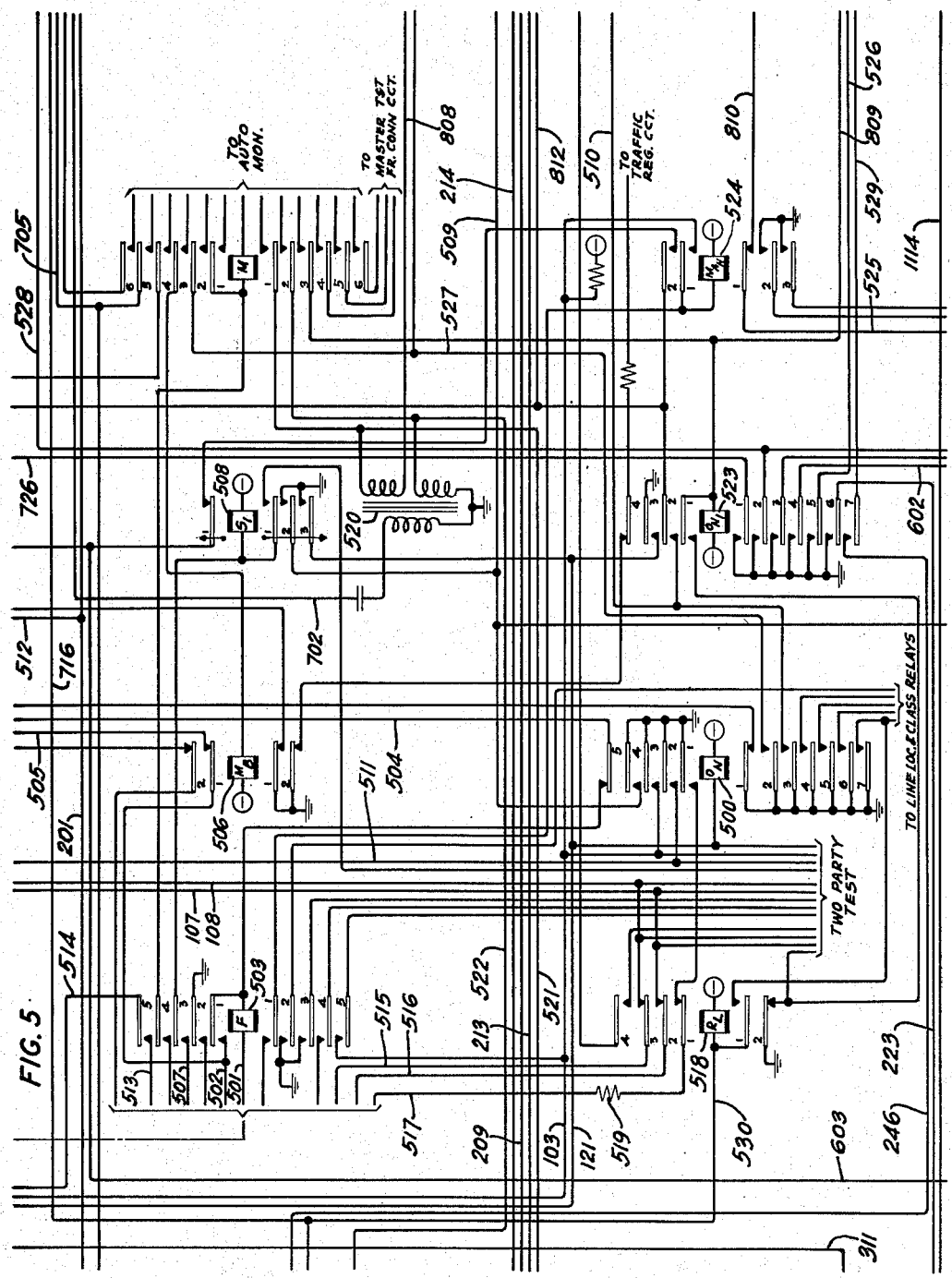
Fig. 5 shows a portion of the register control relays and circuits.

The ON relay 500 upon operating also initiates the operation of the register timing circuit of Fig. 4 by connecting ground over its upper No. 2 contacts to conductor 511 thereby establishing a circuit over the lower back contact of the TMB relay 400 and through the upper winding of the TMA relay 401 to battery. Relay 401 thereupon operates and establishes a locking circuit for itself from battery through its lower winding and inner lower contacts and an operating circuit from battery through the winding of relay 400, thence over its lower contacts, conductor 402, the lower No. 1 back contact of the CNT1 relay 100, conductor 101, over the upper No. 3 back contact of the CRA relay 200, conductor 201, the upper No. 2 contacts of operated relay 803, conductor 806 and in parallel with the contacts of relay 803 from conductor 201, over conductor 512, the lower No. 3 back contact of the PD relay 420 and conductor 403 to conductor 806, and thence over the upper normal contacts of the MST relay 700 to ground on conductor 511. Relay 400 thereupon operates and its lower back contact opens the initial operating circuit of relay 401. Relay 401 upon operating opens at its upper back contact the discharge path for condenser 403 through resistor 405, and at its upper front contact establishes a charging path for condenser 404 extending from the source 406 of positive potential, through resistor 407, over the back contact of the OVL relay 408, through resistor 405, condenser 404, over the upper front contact of relay 401 and to ground through the winding of the TM relay 409. The condenser 404 charges in this circuit at a rate determined by the value of resistors 405 and 407 until it becomes charged, at which time the positive potential applied from the source 406 through resistors 407, 405 and 410 to the control cathode 411 of tube 412, will reach such a value that the tube will break down across its control gap between cathodes 411 and 413, whereupon the TM relay 409 will operate in a path from the source 406, across the main gap of the tube between the cathode 413 and the anode 414, over the upper front contact of relay 401 and to ground through the winding of relay 409. Relay 409 is thus operated a timed interval following the operation of relay 401 for a purpose to be later described unless the holding circuit for relay 401 is opened before the completion of the timing cycle. If the circuit of relay 401 is thus opened and relay 401 releases, it opens the charging path of condenser 404 at its upper front contact and at its upper back contact closes the discharge path for the condenser. Relay 400 which starts its release at the time the locking circuit of relay 401 is opened is made sufficiently slow to release so that it will not reclose the initial operating circuit of relay 400 until the condenser 404 has become substantially discharged.

The marker following its seizure by the calling line secures the location of the calling line on a line-link frame and the class of the calling line and in accordance with the information received with respect to the calling line location proceeds to establish a connection between the selected register and calling line over switches of the trunk-link frame and switches on the line-link frame on which the calling line terminates. The marker also proceeds to transmit the class information to the register. Under the assumption made that the calling line is of the coin box class, the marker establishes a circuit from ground over the trunk-link connector circuit, conductor 513, the upper No. 5 contacts of the F relay 503, conductor 514 and to battery through the winding of the CN relay 102. Relay 102 thereupon operates and locks over its lower contacts, conductor 103 and to ground over the upper No. 3 contacts of the ON relay 500; establishes a biasing circuit from ground over its inner lower contacts and through the lower biasing winding of the CLR relay 104 and establishes a circuit from ground over its inner lower contacts, conductor 105, the lower back contact of the LT1 relay 236 and to battery through the winding of the CN1 relay 206.

The marker after transmitting the necessary information to the register releases the F relay 503 whereupon the register is disconnected from the common leads of the trunk-link and connector circuit so that the leads may be used for other calls and the trunk-link frame relay (not shown) which has been operated from ground over the upper No. 2 contacts of the F relay 503 transfers the tip, ring and sleeve conductors of the dial tone connection to the corresponding conductors 515, 516 and 517 of the register. The ON relay 500 being operated, connects ground over its upper No. 1 contacts and over the upper No. 1 back contact of the RL relay 518 through the low resistance 519, to the sleeve conductor 517 thereby holding the dial tone connection.

A circuit is now effective for the L relay 800 which may be traced from battery over the upper normal contacts of jack 807, through the upper winding of relay 800, over the lower normal contacts of jack 807, conductor 808, through the upper right winding of the dial tone coil 520, conductor 521, in parallel over the upper Nos. 1 and 2 normal contacts of the CR relay 202, the lower No. 1 normal contacts of the CR1 relay 203, conductor 204, the lower No. 3 back contact of the CNT1 relay 100, conductor 107, the upper No. 2 back contact of the RL relay 518, over the ring conductor 516, thence over the calling line loop and returning over the tip conductor 515, the upper No. 3 back contact of relay 518, conductor 108, the lower No. 2 back contact of the CNT1 relay 100, conductor 205, the lower No. 2 back contact of the CR1 relay 203, conductor 522 and to ground through the lower right winding of dial tone coil 520.

The current flowing through the upper winding of relay 800 now overcomes the effect of the current flowing through the middle biasing winding and relay 800 operates its armature into engagement with its right or front contact and, with ground connected to its armature as previously described, completes a circuit extending through the winding of LA relay 804 and the winding of the SR relay 805 to battery. Relay 805 upon operating establishes a circuit over its middle lower contacts and conductor 809, through the winding of the ON1 relay 523 to battery whereby such relay operates, locks over its upper No. 1 contacts to ground at the lower back contact of the RL relay 518, supplies off-normal grounds for the register and over its upper No. 3 contacts establishes a holding circuit for the ON relay 500. The S1 relay 506, which started to release following the release of the F relay 503, being slow to release, does not release to open the circuit of the ON relay 500 before the ON1 relay 523 has operated to prepare the holding circuit for relay 500.

Relay 523 upon operating establishes a circuit from ground over its lower No. 5 contacts, conductor 526, the lower No. 3 back contact of the P2A relay 1100, conductor 1109 and through the winding of the AS relay 1201 to battery whereupon relay 1201, which is the first of a group of seven steering relays which serve to control the successive operation of the groups of register relays shown in Figs. 6 and 9, becomes operated. Relay 1201 upon operating locks in a circuit over its lower No. 1 contacts, the lower No. 3 back contact of the BS relay 1202, and conductor 527 to ground over the lower No. 2 contacts of relay 500.

The SR relay 805 upon operating is also effective to connect the dial tone supply over the inner lower contacts of the P2A relay 1100, conductor 1107, the inner lower contacts of relay 805, conductor 810, the inner lower contacts of the MAN relay 524, conductor 525, the upper No. 5 back contact of the I1D relay 600, conductor 601, the lower No. 4 back contact of the BT relay 701, conductor 702 and through the left winding of the dial tone coil 520 to ground whereupon a dialing tone signal is transmitted to the calling line. The subscriber hearing this tone commences to dial the number of the desired connection.

It will first be assumed that he desires a connection to a zero operator and dials the digit 0. On the first opening of the line loop, the L relay 800 releases thereby opening the circuit previously traced through the windings of the LA relay 804 and the SR relay 805. The SR relay 805 is slow in releasing and holds operated during the momentary openings of the right contact of relay 800 but the LA relay 804 follows relay 800, releasing when relay 800 releases and reoperating when relay 800 reoperates. The LB relay 811 in turn follows the LA relay 804, its operating circuit extending from battery through its winding, over the front contact of relay 804, conductor 812, the upper No. 2 contacts of the ON1 relay 523 and to ground over the lower No. 3 contacts of the ON relay 500. When the first dial pulse occurs and the LA relay 804 releases, a circuit is established from battery through the winding of the RA relay 802 and the back contact of relay 804 to ground on conductor 812 and relay 802 operates and, being slow to release, remains operated during the train of pulses but will release when relays 800 and 804 remain operated at the end of a train of pulses. When relay 802 operates it supplies holding ground from conductor 812, over its lower No. 4 contacts for the LC relay 813, LD relay 814 and LE relay 815. Due to the fact that the RA relay 802 is somewhat slow in operating as well as in releasing, the LB relay is arranged to close this holding circuit over its back contacts until the RA relay 802 has had time to operate.

The RA1 relay 803, which operated as soon as the register was seized by a marker, provides temporary holding circuits for the P1 to P6 relays 1101 to 1106, inclusive. When the RA relay 802 operates, relay 803 releases partly closing the operating circuit of the even P2, P4 and P6 relays and closing the locking circuit for all relays P1 to P6, inclusive. With relay 802 operated and relay 803 released, the register is ready to count dial pulses. On each closure of the left or back contact of the L relay 800, there is a connection of ground from conductor 519, over such contacts, the upper contacts of the SR relay 805, conductor 816, the lower No. 4 back contact of the MST1 relay 703, conductor 704, and to contacts of the LE relay 815. The first release of the L relay 800 in response to the first pulse therefore completes a circuit over the No. 2 back contact of the LE relay 815 and through the winding of the LC relay 813 to battery. Relay 813 thereupon operates and locks in a circuit through the lower winding of the LE relay 815, the upper back contact of the LD relay 814, the inner contacts of relay 813, the lower contacts of the RA relay 802 to ground on conductor 812. Relay 815 does not, however, operate in this locking circuit because until relay 800 reoperates its lower winding is shunted. When, however, relay 800 reoperates, relay 815 operates. On the next release of relay 800 in response to a second dial pulse, ground is again applied to conductor 704 and a circuit is completed over the upper No. 1 contacts and through the upper winding of the LE relay 815 and to battery through the upper winding of the LD relay 814 whereupon relay 814 operates and relay 815 is held operated. Relay 814 upon operating opens the holding circuit for the LC relay 813 extending as traced through the lower winding of relay 815 and relay 813 thereupon releases but relay 815 remains operated over its upper winding in the operating circuit of relay 814. When the L relay 800 reoperates the circuit traced through the upper winding of relay 815 and the upper winding of relay 814 is opened and relay 815 releases but relay 814 is maintained operated over a locking circuit which extends from battery through its lower winding and over its lower contacts to the upper contacts of the LC relay 813 so that relay 814 will keep the circuit over its upper contacts to the winding of relay 813 opened until it has released. On the next or third impulse and the release of the L relay 800, ground applied to conductor 704 is effective to again operate the LC relay 813 and the cycle will be repeated. Pulses Nos. 1, 3, 5, 7 and 9 will thus cause the LE relay 815 to operate and pulses Nos. 2, 4, 6, 8 and 10 will cause relay 815 to release.

The first time that the LE relay 815 operates, it establishes a circuit from ground applied from conductor 812, over the lower contacts of the RA relay 802 to contact 817, thence over its No. 3 contacts to conductor 818 and over the upper No. 2 back contact of the P4 relay 1104, the upper No. 1 back contact of the P2 relay 1102, the upper No. 2 back contact of the P3 relay 1103, the lower No. 2 back contact of the P5 relay 1105 and through the lower winding of the P1 relay 1101 to battery. Relay 1101 thereupon operates and locks in a circuit from battery through its upper winding and over its upper No. 1 contacts, the lower No. 1 normal contacts of relay 1102, the upper No. 1 normal contacts of relay 1103, the upper No. 1 normal contacts of relay 1104, the upper No. 2 normal contacts of relay 1105, conductor 819 and the lower No. 1 back contact of the RA1 relay 803 to ground on conductor 812.

When the LE relay 815 releases in response to the second pulse, ground is connected from conductor 817, over its upper back contact and the upper No. 1 back contact of the RA1 relay 803 to conductor 820 and with the P1 relay 1101 operated a circuit is completed over the lower No. 2 contacts of relay 1101, through the winding of the P2 relay 1102 to battery and in parallel over the upper No. 1 normal contacts and through the winding of the P2A relay 1100 to battery. Relay 1102 thereupon operates and locks over its lower No. 1 alternate contacts and as previously traced over the locking circuit to ground on conductor 819 and opens the locking circuit of the P1 relay 1101 which thereupon releases. Relay 1100 also operates and locks over its upper No. 1 alternate contacts to ground on conductor 510.

When the LE relay 815 again operates in response to the third pulse and connects ground to conductor 818, a circuit is completed over the upper No. 2 back contact of the P4 relay 1104, over the upper No. 1 front contact of relay 1102 and to battery through the winding of the P3 relay 1103. Relay 1103 thereupon operates and locks over its upper No. 1 alternate contacts and the locking circuit previously traced to ground on conductor 819 and at its upper No. 1 normal contacts opens the locking circuit of the P2 relay 1102 which now releases.

On the fourth pulse when the LE relay 815 releases and applies ground to conductor 820, a circuit is established over the lower No. 1 contacts of operated relay 1103 and through the winding of the P4 relay 1104 to battery and relay 1104 operates and locks over its upper No. 1 alternate contacts to ground on conductor 819 and at its upper No. 1 normal contacts opens the locking circuit for the P3 relay 1103 which now releases.

On the fifth pulse when the LE relay 815 again operates and connects ground to conductor 818, a circuit is established over the No. 2 front contact of relay 1104, now operated, and to battery through the winding of the P5 relay 1105 and the latter relay thereupon operates, locks over the lower No. 4 back contact of the P1 relay 1101 and over its upper No. 2 alternate contacts to ground on conductor 819 and at its upper No. 2 normal contacts opens the locking circuit of the P4 relay 1104 which now releases.

On the sixth pulse when the LE relay 815 again releases and connects ground to conductor 820, a circuit is completed over the upper No. 1 contacts of the operated P5 relay 1105 to battery through the lower winding of the P6 relay 1106 and the latter relay now operates and locks through its upper winding and over its upper No. 1 contacts to ground on conductor 819 and over its upper No. 3 contacts establishes an obvious circuit through the winding of the P6A relay 1108 to battery and the latter relay then operates. It is to be noted that the operation of the P6 relay 1106 has not caused the release of the P5 relay 1105.

On the seventh pulse when the LE relay 815 again operates and connects ground to conductor 818 a circuit is established over the upper No. 2 back contact of relay 1104, the upper No. 1 back contact of relay 1102, the upper No. 2 back contact of relay 1103, the lower No. 2 contacts of relay 1106 and to battery through the lower winding of the P1 relay 1101 to battery. Relay 1101 thereupon operates, locks through its upper winding and over its upper No. 1 contacts, the lower No. 1 normal contacts of relay 1102, the upper No. 1 normal contacts of relay 1103, the lower No. 3 contacts of relay 1101, the upper No. 2 contacts of the P6 relay 1106 to ground on conductor 819, and, at its lower No. 4 contacts, opens the locking circuit of the P5 relay 1105 which now releases.

On the eighth pulse when the LE relay 815 again releases and connects ground to conductor 820, a circuit is established over the lower No. 2 contacts of the P1 relay 1101 through the winding of the P2 relay 1102 to battery and relay 1102 operates, locks over its lower No. 1 alternate contacts and the locking circuit previously traced to ground on conductor 819 and at its lower No. 1 normal contacts opens the locking circuit of relay 1101 which now releases.

On the ninth pulse when the LE relay 815 again operates and connects ground to conductor 818, a circuit is established over the upper No. 2 back contact of relay 1104, the upper No. 1 front contact of relay 1102 and through the winding of the P3 relay 1104 whereupon relay 1104 operates, locks over its upper No. 1 alternate contacts and thence as previously traced to ground on conductor 819 and at its upper No. 1 normal contacts opens the locking circuit of the P2 relay 1102 which now releases.

On the tenth pulse when the LE relay 815 again releases and connects ground to conductor 820, a circuit is established over the lower No. 1 contacts of relay 1103 and through the winding of the P4 relay 1104 to battery and relay 1104 operates, locks over its upper No. 1 alternate contacts and the upper No. 1 normal contacts of relay 1105 to ground on conductor 819 and at its upper No. 1 normal contacts opens the locking circuit of the P3 relay 1103 which now releases. The following table shows the relays operated after any pulse:

| Pulse No. | Relays Operated | Register Leads Grounded |
|---|---|---|
| 1 | LC, LE  P1 | 0, 1 |
| 2 |         P2 | 0, 2 |
| 3 | LC, LE  P3 | 1, 2 |
| 4 |         P4 | 0, 4 |
| 5 | LC, LE  P5 | 1, 4 |
| 6 |         P5, P6 P6A | 2, 4 |
| 7 | LC, LE  P1, P6 P6A | 0, 7 |
| 8 |         P2, P6 P6A | 1, 7 |
| 9 | LC, LE  P3, P6 P6A | 2, 7 |
| 10 |        P4, P6 P6A | 4, 7 |

The pulse count will, of course, stop when the dial reaches its normal position so that any P relay or relays may remain operated as shown in the preceding table.

When a train of pulses for a digit ends, the L relay 800 and LA relay 804 remain operated and the RA relay 802 releases thereby causing the reoperation of the RA1 relay 803. Relay 802 at its lower Nos. 2 and 3 contacts now closes paths through the contacts of the P1 to P5 and P6A relays to two of leads 0, 1, 2, 4 and 7 according to the pattern in the preceding table. The operation of the RA1 relay 803 at its lower No. 1 back contact removes ground from conductor 819 thereby releasing any operated P relays and thereby removing ground from the two selected leads. During the operate time of relay 803 and the release time of the P relays, a pair of the register relays of Figs. 6 and 9 will be operated corresponding to the two leads grounded and corresponding to the digits being registered. The leads 0, 1, 2, 4 and 7 will be extended to the groups of five relays of the registers in sequence as will be hereinafter described.

When the P2A relay operated as previously described in response to the second dial pulse, it opened at its inner lower back contact the previously traced circuit through the left winding of the dial tone coil 520 to stop the transmission of dial tone, opened at its lowermost back contact the initial operating circuit of the AS relay 1201 and established the circuit of the EV relay 1208 which may be traced from battery through the winding of relay 1208, over the lower No. 3 back contact of the OD relay 1209, the lower No. 3 contacts of the operated AS relay 1201 and conductor 1210 to ground over the upper No. 3 contacts of relay 1100. Relay 1208 connects the 0, 1, 2, 4 and 7 digit leads over its lower contacts, the upper contacts of operated steering relay 1201 and conductors of cable 1211 to the windings of the relays A0, A1, A2, A4 and A7 of the A digit register 610 shown in Fig. 6. Since the five leads cannot be connected to the relays of the A digit register until relay 1208 operates following the transmission of two pulses a single pulse digit or series of single pulse digits will not affect the A digit register and a wrong number will not be registered if the calling subscriber accidentally generates a single pulse by opening the switchhook contacts before dialing.

*Call for zero operator*

It has been assumed that the calling subscriber has operated his dial to transmit ten pulses since he desires a connection with a zero operator. Consequently, at the end of the series of ten pulses, the P4, P6 and P6A pulse counting relays 1104, 1106 and 1108 are operated and upon the release of the RA relay 802 at the end of pulse series, ground is applied from conductor 509, over the lower No. 3 back contact of relay 802, conductor 821, the upper No. 3 contacts of the P4 relay 1104, the No. 1 front contact of the P6A relay 1108, conductor 7, the lower No. 1 contacts of the EV relay 1208, the upper No. 1 contacts of the AS relay 1201, a conductor of cable 1211 and through the winding of the A7 relay 615 of the A digit register 610 to battery, and ground is applied from conductor 509 over the lower No. 2 back contact of relay 802, conductor 822, the lower contacts of the P4 relay 1104, conductor 4, the lower No. 2 contacts of the EV relay 1208, the upper No. 2 contacts of the AS relay 1201, a conductor of cable 1211 and through the winding of the A4 relay 614 of the A digit register 610 to battery. Relays 614 and 615 both operate and lock over their upper contacts and conductor 602 to ground over the lower No. 4 contacts of the ON1 relay 523. Thus the relays of the A digit register 610 have been operated to register the digit 10.

When the RA1 relay 803 operates at the end of the impulse series, ground is removed at its lower No. 1 back contact from conductor 819 thereby releasing any operated P relays, in the case assumed, P4, P6 and P6A relays 1104, 1106 and 1108, respectively. At its lower No. 2 contacts relay 803 applies ground from conductor 527, over conductor 823, the upper No. 2 contacts of the EV relay 1208 and the lower No. 2 contacts and winding of the AS relay 1201 to battery for holding the relay 1201 operated after the BS relay 1202 operates and until the commencement of the counting of the next digit series and at its lower No. 3 contacts relay 803 applies ground from conductor 527, over conductor 824, the upper No. 1 contacts of the EV relay 1208, the lower No. 5 contacts of the AS relay 1201 and to battery through the winding of the BS relay 1202. Relay 1202 thereupon operates and locks over its lower No. 1 contacts and the lower No. 3 back contact of the CS relay 1203 to ground on conductor 527 preparatory to registering the second digit if dialed. Should a second digit be dialed on a call other than to the zero operator, the RA1 relay 803 releases at the beginning of the second digit series and opens the locking circuit for the AS relay 1201 and the initial energizing circuit for the BS relay 1202. Relay 1201 upon releasing opens the circuit of the EV relay 1208 which now releases and with the BS relay 1202 now locked operated, a circuit is established from battery through the winding of the OD relay 1209, the upper No. 3 back contact of relay 1208 and to ground over the lower No. 5 contacts of relay 1202.

At the end of the second digit when the RA1 relay 803 operates, ground applied to conductor 823 is connected over the lower No. 1 contacts of the OD relay 1209, the lower No. 2 contacts and through the winding of the BS relay 1202 to hold such relay operated when its initial holding circuit is opened by the operation of the CS relay 1203 and ground applied to conductor 824 is connected over the lower No. 2 contacts of the OD relay 1209, the lower No. 4 contacts of the BS relay 1202 and through the winding of the CS relay 1203 whereupon relay 1203 operates and locks over its lower No. 1 contacts and the lower No. 3 back contact of the DS relay 1204 to ground on conductor 527. At the beginning of the third digit series, relay 803 releases and opens the locking circuit for the BS relay 1202 and the initial operating circuit for the CS relay 1203. Relay 1202 upon releasing opens the circuit of the OD relay which now releases and with the CS relay 1203 now locked operated, a circuit is established from battery through the winding of the EV relay 1208, over the lower No. 3 back contact of the OD relay 1209 and to ground over the lower No. 5 contacts of the CS relay 1203. This progression continues as each digit is received and it will be noted that with the BS, DS or FS relays 1202, 1204 or 1206 operated together with the OD relay 1209, the leads 0, 1, 2, 4 and 7 are extended to the B, D or F digit registers 620, 910 and 930, respectively, and that with the CS, ES or GS relays 1203, 1205 or 1207 operated together with the EV relay 1208, the leads 0, 1, 2, 4 and 7 are extended to the C, E and G digit registers 900, 920 or 940, respectively.

In order that the L relay 800 will produce good pulses at its contacts even though the line conditions, dial adjustment and central office voltage have wide variations, corrective devices have been added to the L relay and its associated circuits. The relay is provided with no retractile spring but instead is provided with a middle winding which is energized in the direction to hold the armature against its left or back contact when no current is flowing through its upper or line winding, whereas the line winding is energized in the direction to hold the armature against its right or front contact. This partly compensates for battery voltage variations and also causes the relay to release quickly when the line winding is opened since the releasing force does not decrease as the armature restores to normal as it would if a retractile spring were used. Another advantage of the bias winding is that it causes the armature flux to reverse even though there is a current flow through the line winding and line leak and thus the relay does not have to release against a residual flux due to line leak.

A third or lower winding is provided in order to insure that the contact closures will not be less than a minimum value determined by the time constant of the circuit through the lower winding. When the front or right contact of the relay closes in response to the energization of the upper or line winding, condenser 825 charges in a circuit from ground over conductor 510, over the front contact of the relay, through the winding of the LA relay 804, through the condenser and the lower winding of the L relay 800 to battery. The charging current is in a direction to hold the relay operated and the relay will be held operated at least until the condenser becomes sufficiently charged and the current sufficiently reduced so that the magnetizing force of the lower winding becomes less than that of the middle or biasing winding. When the front contact of the relay opens, condenser 825 discharges in a circuit through the lower winding of the relay and through resistor 826. The direction of the discharge current is such that the armature is held against its back contact at least for the time required for the condenser to discharge and reduce the current sufficiently so that the sum of the magnetizing forces due to the two lower windings becomes less than the magnetizing force due to the upper or line winding. The lower winding of the relay thus causes the armature to remain on whichever contact has closed for a time long enough to perform the required functions even though the line conditions or dial adjustment tend to cause very short contact closures of the relay.

It has been assumed that the subscriber has dialed but one digit zero and therefore when the P4 relay 1104 and the P6 relay 1106 operated to count the ten impulses of this digit and with the AS relay 1201 operated a circuit is established from ground on conductor 819, over the upper No. 2 normal contacts of the P5 relay 1105, the upper No. 1 alternate contacts of the P4 relay 1104, the lower No. 1 contacts of the P6 relay 1106, conductor 1110, the lower No. 4 contacts of the AS relay 1201, conductor 1213, the upper No. 2 contacts of the IID relay 600, conductor 603 and to battery through the winding of the OP relay 114. Relay 414 operates over this circuit, locks over its lower contacts to ground on conductor 812 and establishes a circuit from ground over its upper contacts, conductor 415, the upper No. 3 contacts of the operated CN1 relay 206, the upper No. 5 back contact of the LT2 relay 207 and to battery through the winding of the CR relay 202.

Relay 202 upon operating establishes a holding circuit for the L relay 800 which may be traced from battery over the upper normal contacts of jack 807, through the upper winding of relay 800, over the lower normal contacts of jack 807, conductor 808, through the upper right winding of dial tone coil 520, conductor 521, the upper No. 1 alternate contacts of the CR relay 202, through resistance 208, over conductor 209 and to ground over the No. 3 contacts of the LB relay 811. At its Nos. 1 and 2 normal contacts relay 202 also disconnects the upper or line winding of the L relay 800 from the ring conductor of the calling line so that the 130-volt coin return current when connected to the calling line by the operation of the CR1 relay 203, as later described, will not be connected to the upper winding of the L relay 800. Relay 202 also establishes the circuit of the MST1 relay 703 which circuit extends from battery through the winding of such relay, over conductor 705, the upper No. 4 contacts of relay 202, conductor 210, the lower No. 1 back contact of the TM relay 409 and to ground on conductor 511. Relay 703 thereupon operates and opens at its lower No. 4 back contact the circuit previously traced from the front contact of the line relay 800 to prevent further dial pulse registration.

The CR relay 202 also establishes an obvious circuit over its upper No. 3 contacts for the CR1 relay 203 which operates; at its lower No. 2 back contact disconnects the lower right winding of the dial tone coil 520 from the tip conductor of the calling line, and connects 130-volt coin return battery through resistor 211, over the lower back contact of the CR2 relay 212, the lower No.

2 front contact of the CR1 relay 203, conductor 205, the lower No. 2 back contact of the CNT1 relay 100, conductor 108, the upper No. 3 back contact of the RL relay 518, conductor 515 and thence to the tip conductor of the calling line and over the lower No. 1 alternate contacts of relay 203, conductor 204, the lower No. 3 back contact of relay 100, conductor 107, the upper No. 2 back contact of relay 518, conductor 516 and thence to the ring conductor of the calling line. This current energizes the coin magnet 1301 at the coil box station 1300 in such a manner as to return any deposited coin. It is to be noted, however, that the calling subscriber need not deposit a coin following the dialing of a call to a zero operator, but if he should do so, the coin should now be returned. The CR1 relay 203 is made slow to operate so that the tip and ring conductors of the calling line will have been shorted upon the operation of the CR relay 202 to reduce the click when the battery and ground are removed from the line before relay 203 removes ground through the tone coil from the tip of the line. This short circuit extends from conductor 205 (extended as previously described to conductor 515 and thence to the tip of the line) over conductor 213, over the No. 4 contacts of the LB relay 811, conductor 214 and the upper No. 2 alternate contacts of the CR relay 202 to conductor 204 (extended as previously described to conductor 516 and thence to the ring of the line).

Prior to its operation the CR1 relay establishes a discharge path for condenser 240 which extends through resistor 215, over the lower No. 4 back contact of relay 203 and back to the condenser whereby the condenser is fully discharged. When relay 203 operates, however, the condenser discharge path is opened and a charging path for the condenser is established from battery through resistor 241, through the condenser 240, resistor 215 and to ground over the lower No. 3 contacts of relay 203. After about 0.5 second the voltage across the condenser rises sufficiently to cause the tube 216 to break down across its control gap between cathodes 217 and 218. The C1 relay 219 thereupon operates in a circuit from ground over the lower No. 3 contacts of relay 203, through resistors 215 and 220 across the main gap of tube 216 between cathode 218 and anode 221, through the winding of relay 219 and resistor 241 to battery. Relay 219 upon operating establishes a discharge path over its upper No. 1 contacts through resistor 215 for condenser 240 and establishes the circuit of the CR2 relay 212, which circuit may be traced from battery through its winding, the lower No. 2 back contact of the CR3 relay 222, the upper No. 3 contacts of relay 219, conductor 223 and to ground over the lower No. 6 contacts of ON1 relay 523. Relay 212 thereupon operates, locks over its inner upper contacts, over the upper contacts of CR1 relay 203 and conductor 223 to ground over the lower No. 6 contacts of the ON1 relay 523. At its lower back contact relay 212 opens the connection to the source of coin return current. To absorb the inductive energy in the coin box magnet 1301 and thus prevent an excessive voltage rise, the condenser 224 connected in series with resistor 225 is connected over the lower contacts of the CR relay 202 to conductor 205 and thus to the calling line.

The C1 relay 219 upon operating opens at its lower back contact the discharge path for condenser 226 extending through resistor 227 and such condenser now charges in a circuit from battery through resistors 228 and 227, through the condenser 226 and to ground over the inner upper No. 1 contacts of the CN1 relay 206 and after about 0.5 second its voltage is sufficient to break down the control gap between the cathodes 229 and 230 of tube 231. The main gap between cathode 230 and anode 232 now conducts and current flows from battery through resistor 233, over the upper No. 2 contacts of the C1 relay 219, across the main gap of tube 231 and to ground over the upper No. 1 contacts of the CN1 relay 206 thereby causing the voltage across the combination of tube 216 and C1 relay 219 to be reduced to the sustaining voltage of the tube 231, which voltage will be insufficient to sustain tubes 216. Tube 216 thereupon becomes extinguished. The condenser 234 being connected in parallel with the winding of the C1 relay 219 the voltage at the cathode 221 of tube 216 is maintained positive with respect to ground for enough time to cause the tube to be extinguished and to absorb the inductive energy of the winding of relay 219 so that it will not induce enough negative voltage to fire across the control gap. Condenser 234 also slows the release of relay 219 so that it will not open the circuit over which tube 231 causes tube 216 to deionize until sufficient time has been allowed for deionization to take place.

When tube 216 becomes extinguished and relay 219 releases, the discharge path for condenser 226 is extended over its lower contacts; the cathode-anode path through tube 231 is opened at its upper No. 2 contacts to cause tube 231 to be deionized; the discharge path for condenser 240 is opened at its upper No. 1 contacts permitting condenser 240 to again charge from battery through resistors 241 and 215 to ground over the lower No. 3 contacts of the CR1 relay 203 and establishes the circuit of the CR3 relay 222 which may be traced from battery through the winding of such relay over the upper contacts of the CR2 relay 212 and the upper back contact of relay 219 to ground on conductor 223. Relay 222 upon operating now locks over its upper contacts and the upper contacts of the CR1 relay 203 to ground on conductor 223, and connects 48-volt potential through the winding of the LT relay 235, the lower No. 1 back contact of the CRA relay 200, the lower No. 1 contacts of relay 222, the lower front contact of the CR2 relay 212 and thence over the circuits traced to the tip and ring conductors of the calling line to test for the coin. If the coin has left the trap or in case no coin has been deposited relay 235 will not operate, but if the coin is stuck relay 235 will operate since the coin magnet will still be connected to the line. About 0.5 second after the CR3 relay 222 operates, the condenser 240 will become charged and tube 216 will fire as previously described and again cause the operation of the C1 relay 219. If relay 235 is operated, a circuit is now established from ground on conductor 223 over the upper No. 3 contacts of relay 219, the lower No. 2 front contact of relay 222, the front contact of relay 235, the upper No. 1 back contact of the LT1 relay 236 and to battery through the winding of the LT2 relay 207 and relay 207 will be operated indicative that the coin, if deposited, has not cleared the trap. If relay 235 is not operated, the previously traced circuit extends over the back contact of such relay, the lower back contact of the LT2 relay 207 and to battery through the winding of the LT1 relay 236 which is operated indicative that the deposited coin has cleared the trap.

It will be first assumed that the coin has cleared and that the LT1 relay 236 has operated and locked over its lower front contact to ground on conductor 223 and at its lower back contact has opened the circuit of the CN1 relay 206. Relay 206 now releases and establishes a circuit from ground over the upper contacts of operated OP relay 414, conductor 415, the upper No. 4 back contact of relay 206, conductors 237 and 712, over the upper contacts of the TMB relay 400, conductor 711, the upper back contact of the CR4 relay 238, conductor 239 and to battery through the winding of the MST relay 700. Relay 700 thereupon operates; establishes a circuit from ground over its lower No. 5 contacts, the upper No. 3 back contact of the MRL relay 706, the lower No. 1 back contact of the BT relay 701 and conductor 707 to start the timer of the marker connector (not shown); connects battery over its lower No. 2 contacts and conductor 708 for supplying battery to the marker connector for the operation of the marker connector relays such as the RA relay 1001 and establishes a start circuit from battery over its lower No. 3 contacts, the upper No. 2 back contact of the MRL relay 706, the lower No. 2 back contact of the BT relay 701 and start conductor 710 to ground through the winding of the register sequence (RS) relay 1000 of the marker connector. The latter relay, in the order of its preference, causes the operation of the register connector (RA) relay 1001 which over its lower contacts and the back contact of the connector busy (CB) relay 1002 of the marker connector completes a circuit through the winding of the marker sequence (MS) relay 1003 to ground. Relay 1003 thereupon operates and locks over its lower alternate contacts, closes the circuit of the marker connector (MA) relay 1004 over its upper front contact and opens the circuits of the normally operated relays 1005 and 1006 which release and apply ground to conductor 1007 of the marker as a signal that it has been connected to an originating register for establishing a connection from a calling line. With the RA relay 1001 and the MA relay 1004 both operated, control leads are extended from the originating register to the marker.

Relay 700 at its lower No. 8 contacts and over conductors 711 and 712, shunts the upper contacts of the TMB relay 400 so that the holding circuit of relay 700 will be independent of relay 400 and opens at its upper normal contacts the locking circuit of the TMA relay 401 and the operating circuit of the TMB relay 400, whereupon such relays release to open the charging circuit of condenser 404 associated with the register timer tube 412 and to close the discharge path for the condenser to thereby recycle the timer which has up to this time been functioning for timing. On dial tone first operation, permanent signal timing is from the operation of relay ON relay 500 to the operation of the P2A relay 1100 and the PD relay 420 at the first digit, partial dial timing is from the time the MST1 relay 703 operates and the PD relay 420 releases at the end of dialing and the beginning of coin test or coin return and coin test timing is from this point to the end of coin test when stuck register timing starts. Stuck register timing ends when the ON relay 500 releases at the end of the use of the originating register. Relay 703, when operated as previously described, provides over its lower No. 3 contacts a holding circuit for the RA1 relay 803 which extends through the winding of relay 803, conductor 827, the No. 3 contacts of relay 703 and to ground on conductor 509 so that the digit steering circuits of Fig. 12 will not advance further; at its lower back contact relay 703 opens the pulse lead 704 so that further pulsing will be ineffective; and establishes a circuit from ground over the lower No. 2 contacts of the ON1 relay 523, conductor 528, the lower No. 2 contacts of relay 703, conductor 714, the upper No. 4 contacts of the EV relay 1298, the upper No. 1 contacts of the BS relay 1202 and a conductor of cable 1212 to battery through the winding of the B7 relay 625 of the digit register 620. This register relay operates to connect ground to a conductor of cable 604 extended over contacts of relays 1001 and 1004 of the marker connector to the marker to inform the marker that the last digit dialed by the subscriber was an A digit.

With the RA relay 1001 and the MA relay 1004 of the marker connector both operated, control leads are extended from the register to the marker. Among these leads are leads from the contacts of the operated relays 614 and 615 of the A digit register 610 which are extended over conductors of cable 604 and to the marker registers 1008; leads which extend to the marker to indicate the tens and units digits of the class of service of the calling line; leads which indicate the line-link frame tens and units digits, the horizontal group, the vertical group and the vertical file of the calling line location; the number of the line link of the dial tone connection; the leads 416, 417 and 418 of cable 709 to inform the marker whether the call was a permanent signal, a partial dia or a regular call; and to extend the leads 242, 243 and 244 to inform the marker that a coin has been returned, a stuck coin has encountered, or that no coin return has been attempted; and to extend lead 245 to the marker to enable the marker to control coin return when necessary.

It has been assumed that the coin, if deposited, is not stuck and that the LT1 relay 236 has operated to connect ground over its upper No. 2 front contact to conductor 242 thereby causing the operation of the CR relay 1009 in the marker to inform the marker that the coin has been returned. Relay 236 also removes ground at its upper No. 2 back contact from the lead 244 which lead would be connected to ground when a coin has not been refunded and a stuck coin has not been encountered to operate the SCK relay 1010 relay in the marker. The release of the CN1 relay 206, following the operation of relay 236, opens the operating circuit of the CR relay 202 which releases, in turn releasing CR1 relay 203. The release of relay 203 again connects the tip and ring leads 515 and 516 to the upper line winding of the L relay 800 and to the dial tone coil 520; opens at its lower No. 3 contacts the ground supply to the timing tube 216 and the C1 relay 219, releasing the relay and deionizing the tube; and opens the locking circuits of the CR2 relay 212 and CR3 relay 222 which release. The coin return circuits of the originating register are then in normal condition.

If, however, upon the stuck coin test a stuck coin is found and the LT2 relay 207 is operated, it locks over its upper No. 1 contacts, the lower back contact of the CRA relay 200 and to ground on conductor 223; opens the circuit of the CR relay 202 at its upper back contact thus releasing relay 202 which performs the functions just described. Relay 207 also connects ground over its upper No. 3 contacts, to conductor 239 to cause the operation of the MST relay 700 which functions as previously described, and connects ground over the upper No. 2 back contact of the LT1 relay 236, over the upper No. 2 front contact of the LT2 relay 207 and conductor 243 to cause the operation of a relay (not shown) in the marker as a signal that a stuck coin has been detected and that the line should be connected to a stuck coin trunk.

If the marker cannot establish a connection to a stuck coin trunk, it operates the BT relay 701 in the originating register which, upon operating, locks to ground over the lower No. 4 contacts of the MST relay 700 and opens the circuit over conductor 710 to cause the release of the marker connector and the marker. At its lower No. 3 contacts relay 701 connects ground to start conductor 715 of the line busy interrupter circuit whereupon line busy tone is transmitted over the lower No. 4 front contact of relay 701, conductor 702 and through the left winding of dial tone coil 520 whereupon the busy tone is transmitted to the calling line. The subscriber hearing the tone will restore his receiver to the switchhook whereupon the L relay 800 will release followed by the release of the SR relay 805 and the LA relay 804. With the SR relay 805 released the circuit of the CRA relay 200 is now established from battery through its winding, over the lower front contact of the CN1 relay 206, conductor 246, the lower contacts of the ON1 relay 523, conductor 529 and to ground over the lower back contact of relay 805. Relay 200 upon operating causes the operation of the CR relay 202, whereupon the previously described coin return cycle is initiated. Relay 200 at its lower back contact opens the locking circuit of the LT2 relay 207 so that at the end of the coin return cycle the LT1 relay 236 may be operated. Relay 236 upon operating releases the CN1 relay 206 whereupon the circuit of the register release (RL) relay 518 is established from battery through its winding, conductor 530, the lower back contact of relay 206, conductor 246, the lower contacts of the ON1 relay 523, conductor 529 and to ground over the back contact of the SR relay 805. The register will then be restored in the manner described hereinafter.

If the coin when deposited has been properly refunded and if the marker having been given all of the information for establishing the call to the zero operator has completed its other functions, then it is ready to establish the connection to the zero operator. The marker connects ground to conductor 716 of cable 709, thereby establishing a circuit through the winding of the RL relay 518 to battery. Relay 518 thereupon operates, locks over its lower No. 1 contacts to ground over the lower No. 7 contacts of the ON relay 500; at its upper Nos. 2 and 3 contacts opens the tip and ring conductors of the dialing connection to the calling line so that the inductive load at the cross-point contacts of the switches involved in the dialing connection will not be broken; and opens the sleeve conductor to release the dial tone connection. The L relay 800 now releases but the SR relay 805 and LA relay 804 are held operated over a circuit which may be traced from battery through their windings, conductor 828, the lower No. 1 contacts of the MST relay 700, conductor 717, the inner lower contacts of the RA relay 1001 and contacts of relay 1020 to ground on conductor 707 applied over the lower contacts of the MA relay 1004 or over the lower No. 1 back contact of the BT relay 701, the upper No. 3 back contact of the MRL relay 706 and over the lower No. 5 contacts of the MST relay 700.

After completing the originating connection to the calling line the marker connects ground to lead 718 of cable 709 thereby causing the operation of the MRL relay 706. Relay 706 upon operating locks over its No. 1 contacts to ground over the lower No. 4 contacts of the MST relay 700, opens the start lead 710 thereby releasing the RS relay 1000 of the marker connector which releases, in turn releasing the RA relay 1001, the MS relay 1003 and the MA relay 1004 of the marker connector. Relay 706 also removes ground from conductor 707 to stop the marker connector timer. The removal of ground from conductor 707 at the contacts of relay 706 and by the release of the MA relay 1004, removes ground from conductor 717 thereby releasing the SR relay 805 and the LA relay 804. Relay 805 upon releasing permits the release of the ON1 relay 523 followed by the release of the ON relay 500 which latter relays remove ground from the off-normal ground conductors of the register thereby releasing all operated relays of the register. In some cases several relays release in cascade. For example, the removal of ground from conductor 812 releases the OP relay 414 which in turn releases the MST relay 700 which in turn releases the MRL relay 706. The register is now ready for another call and indicates that it is idle by reconnecting the lead 501 through the winding of the F relay 503 to the lead 502.

X11 calls

It will now be assumed that the calling subscriber has dialed the three digits of an X11 code which will comprise an A digit, for example 2, followed by a B digit 1 and a C digit 1. In the manner previously described, the pulse counting circuits of Fig. 11 and the steering circuits of Fig. 12 will function to cause the A digit 2 to be registered by the A digit register 610 through the operation of the A0 and A2 register relays 611 and 613, to cause the B digit to be registered by the B digit register 620 through the operation of the B0 and B1 register relays 621 and 622 and to cause the C digit to be registered by the digit register 900 through the operation of the C0 and C1 register relays 901 and 902. An X11 code is dialed when a connection is desired to a service operator's position, for example 211 on a call to a toll operator, 411 on a call to an information operator, 611 on a call to the repair desk, or 811 on a call to the business office. On such calls the coin should be returned.

When the B0 and B1 relays 621 and 622 of the B register operate, they establish circuits for the SB0 and SB1 relays 630 and 631 respectively; when the C0 relay 901 operates a circuit is established from ground over its lower contacts, conductor 632 and through the winding of the SC0 relay 633 to battery, and when the C1 relay 902 operates with relays 630, 631 and 633 all operated, a circuit is established from ground over the lower contacts of relay 902, conductor 634, the contacts of relay 630 and 631, the lower No. 3 back contact of the 11D relay 600, the contacts of relay 633 and through the winding of the SC1 relay 635 to battery. Relay 635 thereupon operates, disconnects ground from the LT lead 636, indicative that a local translator is not required (strap 637 being omitted if the relays 630, 631, 633 and 635 are supplied to furnish the X11 code feature) and connects ground from the upper No. 4 back contact of the 11D relay 600, over the upper front contact of relay 635, to conductor 638 extending over cable 604 to inform the marker that an X11 code has been dialed. Relay 635 at its lower contacts connects ground to conductor 639 thereby completing a circuit for the CNT relay 106 which may be traced from conductor 639, the MST1 punching of Fig. 3, conductor 310, over the upper front contact of the CN relay 102, the upper back contact of the GT1 relay 109 and to battery through the winding of relay 106. Relay 106 upon operating establishes a circuit from ground over the lower front contact of the TMB relay 400, conductor 419, the upper No. 1 contacts of relay 106, the upper No. 3 back contact of the CNT1 relay 100 and to battery through the winding of the CNT2 relay 110 and the latter relay operates. Relay 110 upon operating establishes a circuit from battery through the winding of the MST1 relay 703, over conductor 705, the lower contacts of relay 110, conductor 210, the lower No. 1 back contact of the TM relay 499 and to ground on conductor 511, whereupon relay 703 operates and locks over its upper No. 1 contacts to ground on conductor 511, prevents further dial registration and performs the other functions previously described.

Relay 110 also establishes a holding circuit for the L relay 800 to maintain it operated during the coin test which circuit extends as previously traced through the upper winding of relay 800 to conductor 521, thence over the inner lower contacts of relay 110, conductor 111, through resistor 208, conductor 209 and to ground over the No. 3 contacts of the LB relay 811. In addition, relay 110 establishes a circuit from battery through the winding of the CNT1 relay 100, over the upper No. 2 contacts of relay 106, over the upper contacts of relay 110, conductor 112 and to ground over the upper No. 2 back contact of the CRA relay 200. Relay 100 upon operating locks in a circuit over the upper No. 2 contacts of relay 106 and its own upper No. 1 contacts to ground on conductor 112 and at its lower No. 2 and No. 3 transfer contacts transfers conductors 107 and 108 (extended to the tip and ring conductors of the calling line) from the upper or line winding of the L relay 800 and the upper right winding of the dial tone coil 520 to the windings of the GT relay 113 and the upper and middle windings of the CLR relay 104 and thence through the resistance network comprising resistors 115, 116, 117, and 118, 119, 120 and over the upper No. 2 front contact of the CNT1 relay 100 to battery.

The resistors 115 to 120, inclusive, are so proportioned that about −90 volts is supplied to the ring windings of relays 104 and 113 and about −40 volts is supplied to the tip windings. The circuits through both the line windings of relay 104 are aiding and the relay will operate if the switchhook contacts are closed regardless of whether a coin has been deposited. The bias winding of relay 104 opposes the line windings and aids in releasing the relay when the switchhook contacts open. The operation of relay 104 holds the CNT2 relay 110 operated over the locking circuit of the CNT1 relay 100 after the initial operating circuit of relay 110 is opened at the upper back contact of relay 100, relay 110 being slow to release so that it will not release during the interval between the operation of relay 100 and the operation of relay 104, or if the contacts of relay 104 open falsely due to frame vibration or due to transients when the coin is deposited. If the subscriber should disconnect at this time relays 104 and 110 will release followed by the release of the L relay 800 and the SR relay 805 thereby returning the coin and releasing the register as on any abandoned call.

The GT relay 113 tests for the deposit of a coin in the coin box. The windings of this relay have equal turns and are connected so that with no ground at the station which would be the case if no coin is deposited, the magnetomotive forces of the windings are opposing and the relay does not operate. When the 1020-ohm ground is connected by the deposit of a coin, the current in the ring winding of relay 113 is increased and the current in the tip winding is decreased so that the relay operates and establishes a circuit from battery through the winding of the GT1 relay 109, over the contacts of relay 113 and to ground on conductor 223 whereupon relay 113 operates and locks over its lower No. 1 contacts to ground on conductor 223. At its lower No. 2 front contact relay 109 connects ground to conductor 121 to hold the ON relay 500 operated and at its upper back contact opens the circuit of the CNT relay 106 which releases and in turn causes the release of the CNT1 relay 100. Relay 100 upon releasing recloses the lead 402 to the TMA relay 401 and to the TMB relay 400 so that the timer may be controlled to measure other time intervals, disconnects the calling line from the windings of the GT relay 113 and the windings of the CLR relay 104, which latter relays then release and reconnects the calling line to the upper right winding of dial tone coil 520 and to the line winding of the L relay 800, which relay now remains operated over the calling line loop. The release of relay 104 releases the CNT2 relay 110 which opens the holding circuit of the L relay 800.

With the GT1 relay 109 operated, a circuit is now established from ground on conductor 310 over the upper front contact of the CN relay 102, the upper front contact of relay 109, conductor 415, the upper No. 3 contacts of the CN1 relay 206, the upper No. 5 back contact of the LT2 relay 207 and through the winding of the CR relay 202 to battery. Relay 202 now functions as previously described to cause the return of the deposited coin. When the coin has cleared the trap the LT1 relay 236 operates as previously described thereby releasing the CN1 relay 206. The circuit of the MST relay 700 is now established from ground on conductor 310, over the upper front contact of the CN relay 102, the upper front contact of the GT1 relay 109, conductor 415, the upper No. 4 back contact of relay 206, conductors 237 and 712, the upper contacts of the TMB relay 400, conductor 711, the upper back contact of the CR4 relay 238 and conductor 239 through the winding of the MST relay 700. Relay 700 now operates to cause a marker to be connected with the originating register.

With the MST1 relay 703 operated as previously described, a circuit is established from ground over the lower No. 2 contacts of the ON1 relay 523, over conductor 528, the lower No. 2 contacts of relay 703, conductor 714, the upper No. 4 contacts of the EV relay 1208, the upper No. 1 contacts of the DS relay 1204, a conductor of cable 1214, through the winding of the D7 relay 915 of the D digit register 910 to battery. This relay operates to connect ground to a conductor of cable 604, extended over contacts of relays 1001 and 1004 of the marker connector to the marker to inform the marker that the last digit dialed by the subscriber was a C digit. From this point the circuits function in the manner described in connection with a call to the zero operator.

Figure 1:
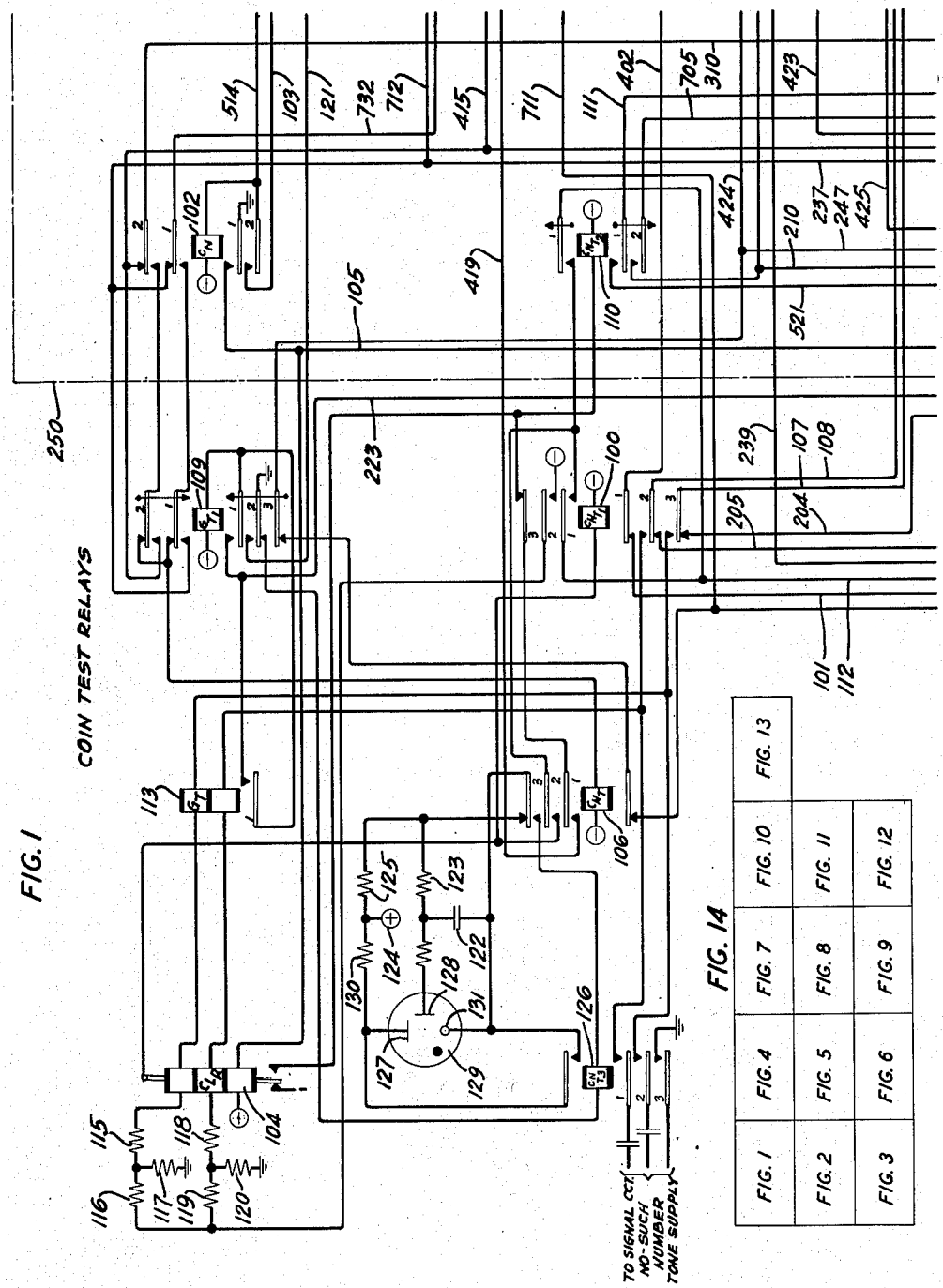
Figure 2:
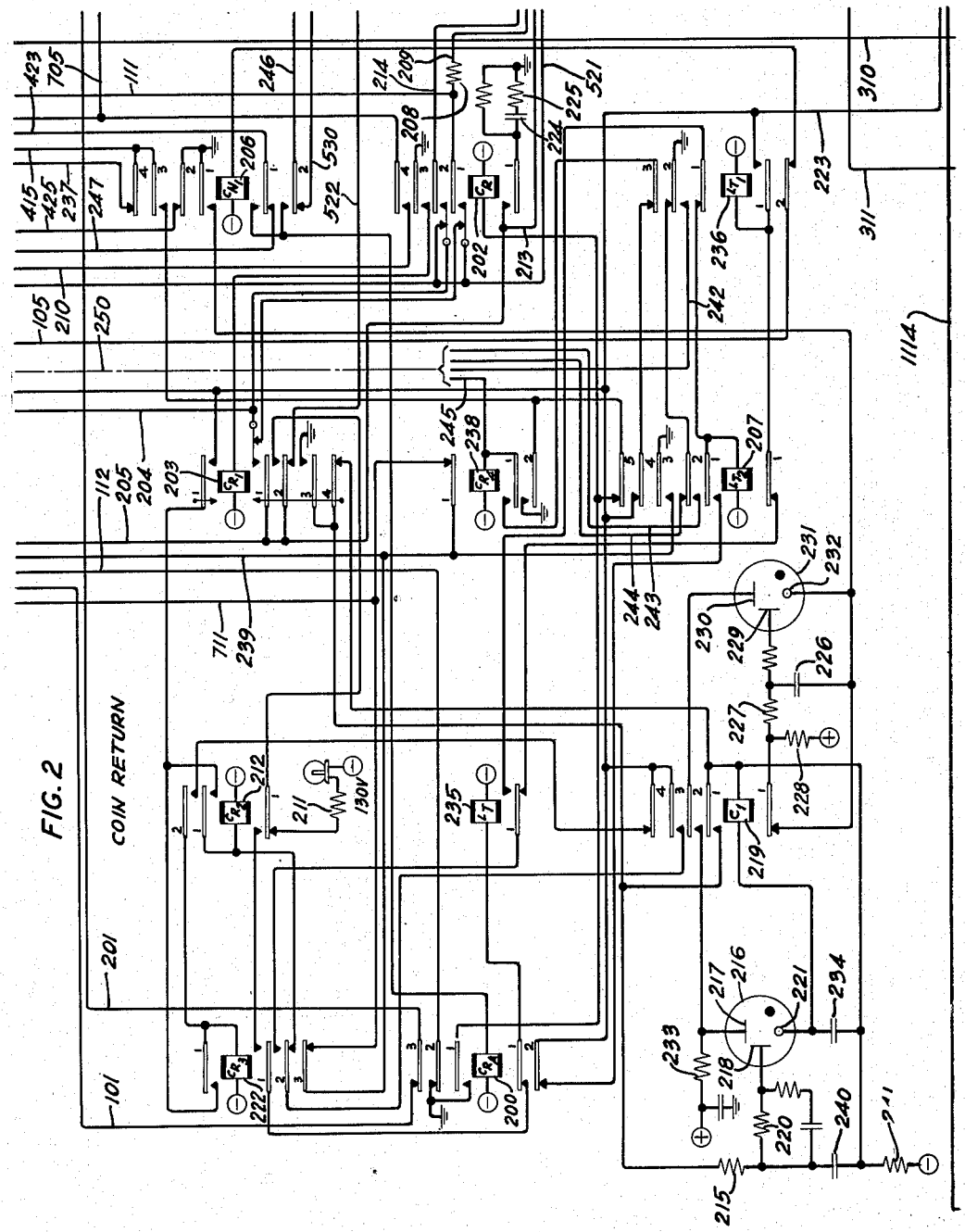
Fig. 2 shows the coin return relays and related circuits.

If a coin was not deposited, the GT relay 113 will not operate and the call will be blocked. However, at the beginning of the coin test when the CNT relay 106 is operated, the timing circuit shown in the left portion of Fig. 1, is started by the removal of the discharge path for condenser 122 through resistor 123 and over the upper back contact of relay 106, and the closure of a charging path for such condenser from the source of current 124, through resistors 125 and 123, through condenser 122 upper No. 3 front contact of relay 106, the winding of the CNT3 relay 126 and over the lower No. 2 back contact of the GT1 relay 109 to ground. The condenser charges and after ten to seventeen seconds the voltage across the condenser will be sufficient to break down the control gap between the cathodes 127 and 128 of the tube 129. Relay 126 will now operate in a circuit from battery 124, through resistor 130, over the main gap of tube 129 between the anode 131 and cathode 127, the upper front contact of the CNT relay 106, through the winding of relay 126 and to ground over the lower No. 2 back contact of relay 109. Relay 126 upon operating locks in a circuit from battery 124, through resistor 130, the upper contacts of relay 126, the upper front contacts of relay 106 through the winding of relay 126 and to ground at the lower No. 2 back contact of relay 109; short-circuits the main gap of tube 129 over its upper contacts to extinguish the tube and at its lower No. 3 contacts closes a start circuit to the no-such-number tone circuit. Tone current from such source is now transmitted over the lower Nos. 1 and 2 contacts of relay 126 and the lower Nos. 2 and 3 contacts of the CNT1 relay 100 to the tip and ring conductors of the calling line so that the calling subscriber hears the no-such-number tone. While this tone is being transmitted the coin test relays are still effective and the deposit of a coin will cause the call to proceed or disconnect will release the register and the dial tone connection.

If the subscriber takes neither of these actions, the register timing circuit of Fig. 4 will time out twenty to thirty-five seconds after the coin test has started and will release the register and dial tone connection in a manner to be later described. The subscriber will get dial tone from another register and will be connected to a permanent signal holding trunk if he takes no further action.

*11X calls*

In some exchange areas service operators, such as toll, information, repair and so forth, are called by dialing 11X codes rather than X11 codes. 11X codes comprise a first digit of one pulse followed by a second digit of one pulse, both of which are counted on relays, and then followed by a third digit of the required number of pulses. If calls to service operators are made by the dialing of X11 codes, then the 11X codes may be used in the same office areas as directing codes. For example, in an office area near a large city, subscribers in the local offices may be reached in the usual manner by dialing the proper office code digits followed by the numerical digits of the line number but calls to subscribers in offices in the nearby city area could be reached by first dialing a 11X directing code to direct the call to that city, followed by the office code and numerical digits of the desired line in the city. Or for example, the directing code might be used when one city calls another city or one State calls into another State. For counting the two one-pulse prefix digits, the prefix counter comprising the 11A, 11B, 11C and 11D relays 643, 644, 645 and 600, respectively, are provided. If the 11X codes are to be used as first assumed for service connections, then the strap 642 is closed but if used as directing codes such strap is left open. In the event the 11X codes are not used at all, the straps 640 and 641 are closed.

It will now be assumed that a coin box subscriber dials a 11X code, for example, a call for a toll operator. Such a code in accordance with the usual procedure would comprise a first digit of one pulse, a second digit of one pulse, and a third digit of ten pulses. The prefix counter of Fig. 6 functions in the following manner. In response to dialing the first digit 1, the P1 pulse counting relay 1101 is operated and upon the release of the RA relay 802 at the end of the first pulse series, a circuit is established from ground on conductor 509, over the lower No. 2 back contact of relay 802, conductor 822, the upper No. 2 contact of the P1 relay 1101, the upper No. 2 back contact of the P2A relay 1100, conductor 1111, over the lower back contact of the 11B relay 644, and to battery through the winding of the 11A relay 643. Relay 643 thereupon operates and locks over its lower contacts to ground on conductor 509 and establishes a circuit from battery through the winding of the 11B relay 644, over its upper contacts, conductor 1112, the upper No. 4 back contact of the P1 relay 1101 to ground on conductor 509, after relay 1101 releases and when the RA1 relay 803 operates following the release of the RA relay 802. Relay 644, upon operating, locks over its upper contacts to ground on conductor 509. When a second digit 1 is dialed and the P1 relay 1101 reoperates, it establishes the previously traced circuit over conductor 1111 which, with the 11B relay operated, now extends over its lower front contact and to battery through the winding of the 11C relay 645. Relay 645 thereupon operates and locks to ground on conductor 509, and over its upper contacts establishes an obvious circuit for the 11D relay 600. Additional "ones" will have no effect and a single "one" will not cause the operation of the 11D relay 600 and will therefore have no effect.

Relay 600 upon operating opens at its upper No. 5 back contact the circuit over which dial tone current was applied to the dial tone coil 520 so that the transmission of dial tone to the calling line is discontinued; removes ground at its upper No. 4 back contact from lead 636 of cable 604 as a signal that a local translation is not required; connects ground at its upper No. 4 front contact to lead 646 of cable 604 so that the marker can translate the following dialed digits properly and opens at its upper No. 2 back contact the circuit of the OP relay 414 to prevent cancelling the coin test when 110 is used for calling the toll operator.

In response to the dialing of the third digit, assumed to be 10, the P4, P6, and P6A pulse counting relays 1104, 1106 and 1108 will be operated and upon the release of the RA relay 802 at the end of the third digit series, with the EV relay 1208 and the AS relay 1201 operated, the A4 and A7 relays 614 and 615 of the A digit register 610 will be operated and, upon the reoperation of the RA1 relay 803, the BS relay 1202 will be operated in the manner previously described. With the 11D relay 600 previously operated, a circuit will now be established from ground over the upper No. 3 contacts of relay 600, conductor 647, the upper No. 6 contacts of the BS relay 1202, conductor 648 to the punching MST1 of Fig. 3, thence over conductor 310, the upper front contact of the CN relay 102, the upper back contact of the GT1 relay 109 and through the winding of the CNT relay 106 to battery whereupon relay 106 operates to cause the initiation of testing for a deposited coin in the manner previously described. The tests for the deposited coin, the return of the coin, the connection to a marker for the completion of the connection and the release of the originating register then proceed in the same manner as described in connection with an X11 call.

Figure 3:
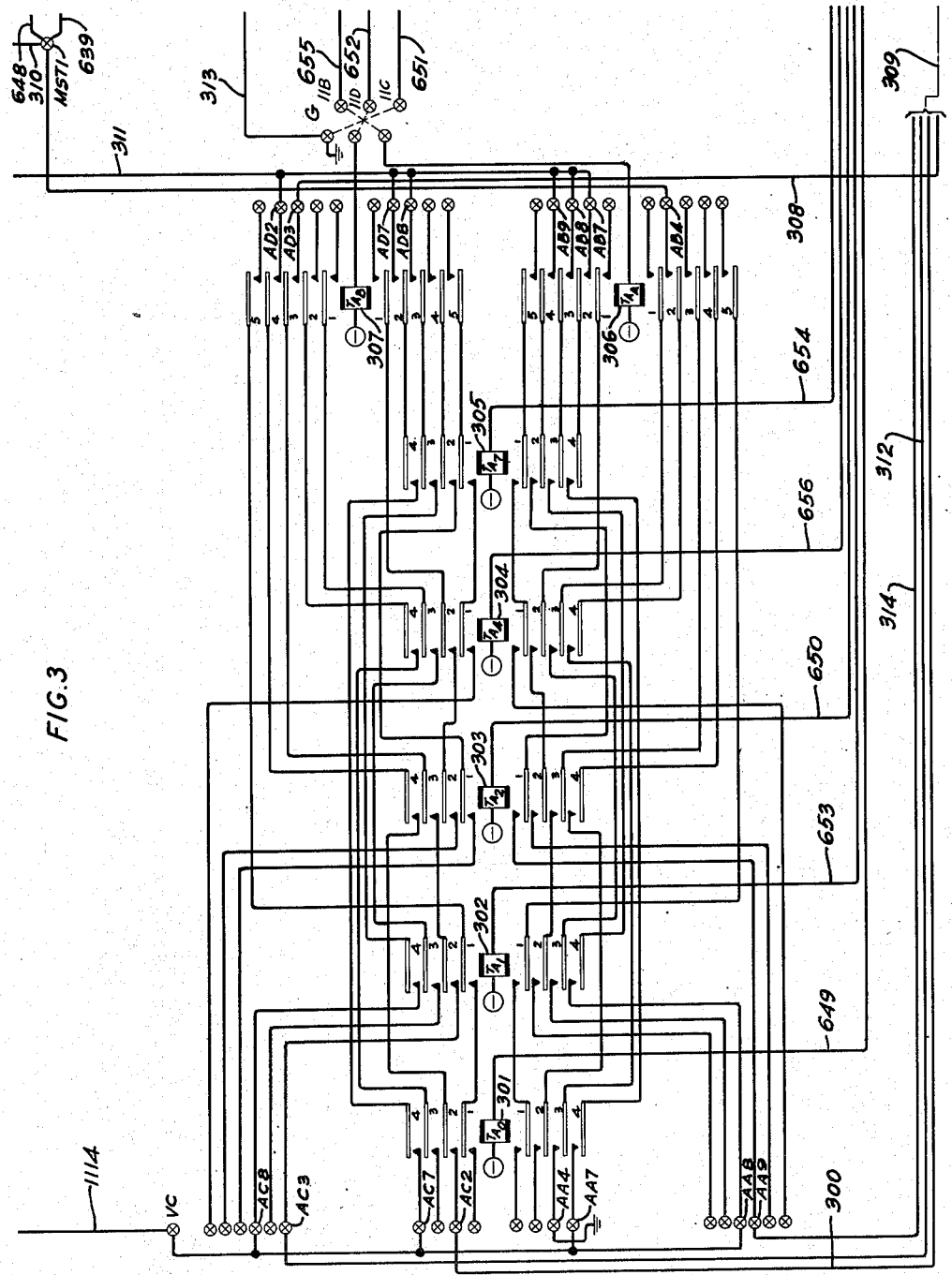
Fig. 3 shows the A digit translator.

In the event the 11X codes are used as directing codes, the strap 637 is omitted and the terminals 11B, 11C and 11D shown in the right portion of Fig. 3 are cross-connected as required to the A digit translator circuit of Fig. 3 or directly to terminals at the right of Fig. 12 to inform the marker as to how many digits to expect. It is to be noted that the TA0—TA7 relays 301 to 305, inclusive, of Fig. 3 are operated in response to the operation of the A0—A7 relays 611 to 615, respectively of the A digit register 610 and that the TAA relay 306 operates when the 11D relay 600 is not operated, indicative of the fact that a directing code has not been dialed and that the TAB relay 307 operates if relay 600 is operated in response to a directing code. Two groups of ten paths are provided over the contacts of the relays 301 to 305, inclusive, the upper group or half of the translator being effective if the TAB relay 307 is operated and the lower group or half of the translator being effective if the TAA relay 306 is operated. The punchings at the left of Fig. 3 are cross-connected over conductors of cable 309 to the D, E, F and G punchings at the right of Fig. 12 and the corresponding punchings at the right of Fig. 3 are cross-connected either to the MST punching of Fig. 4 to provide for the operation of the MST relay 700 to call in a marker when the required number of digits as determined by the A code have been received or to punching MST1 at the right of Fig. 3, or may be connected over conductor 308 of cable 309 to the DL punching of Fig. 12 when a delay is required before operating the MST relay 700 to determine if an additional digit is to be expected. Punchings at the left of Fig. 3 which correspond to unused A digits are cross-connected to the punching VC to enable the MST relay 700 to be operated to select a marker as soon as the A digit has been registered. In this case the call would be routed to a vacant code trunk.

Under the assumption that a 11X directing code has been dialed comprising the digits 1, 1 and 2, the 11D relay 600, the A0 relay 611 and the A2 relay 613 of the A digit register 610 are operated. As a consequence, relay 611 has established a circuit from ground over its lower contacts and conductor 649 through the winding of the TA0 relay 301 to battery and relay 613 has established a circuit from ground over its lower contacts and conductor 650 through the winding of the TA2 relay 303 to battery thereby registering the A code digit 2 in the A digit translator. The 11D relay 600 has also established a circuit from the G punching, strapped to the 11C punching of Fig. 3, over conductor 651, the lower No. 2 contacts of relay 600 and conductor 652 to the 11D punching strapped to the winding of the TAB relay 307 thereby causing the operation of the latter relay. It will be assumed that the directing code is for a call to a line of another exchange area to which five digits must be transmitted to establish a desired connection and that therefore the MST relay 700 should not be operated to call in a marker until a sixth digit has been registered by the relays of the F digit register 930. For this purpose the punching AC2 at the left of Fig. 3 is cross-connected over conductor 300 of cable 309 to the punching F at the right of Fig. 12.

In the manner previously described the several dialed digit series are received and at the end of the fifth digit series following the 11X code digits, when the RA relay 802 releases and the RA1 relay 803 reoperates the GS steering relay 1206 will be operated and apply ground over its lower No. 5 contacts to punching F, thence over conductor 300 of cable 309 to punching AC2 of Fig. 3, over the upper No. 2 contacts of the TA0 relay 301, the upper No. 4 contacts of the TA2 relay 303, the upper No. 4 contacts of the TAB relay 307 to punching AD2 strapped over conductor 311 to punching MST of Fig. 4, thence over conductor 732, the inner upper front contact of the CN relay 102, the inner upper back contact of the GT1 relay 109 and through the winding of the CNT relay 106 to battery. Relay 106 thereupon operates to initiate the coin test as previously described. If the coin has been deposited, the GT1 relay 109 is operated whereupon the ground on punching MST is effective to establish a circuit over conductor 732, the inner upper front contact of relay 102, the inner upper front contact of relay 109, conductor 712, the upper contacts of the TMB relay 400, conductor 711, the upper back contact of the CR4 relay 238, conductor 239 and to battery through the winding of the MST relay 700.

No coin return is made by the register at this time and since the LT1 relay 236 and the LT2 relay 207 are both unoperated ground is connected over the upper No. 2 back contact of relay 236 and the upper No. 2 back contact of relay 207 and over conductor 244 of cable 250 to thereby cause the operation of the SCK relay 1010 in the marker. The marker receives the information from the originating register concerning the location of the calling line and the number of the desired line and proceeds to set up the connection between the lines, the connection including a coin trunk which is capable of disposing of the deposited coin. The DIS2 and DIS1 disconnect relays of the marker 1012 and 1013 are thereafter operated in a circuit which may be traced in part over back contacts of the RRK relay 1011 and the RRC relay 1014 and a signal is sent to the originating register to operate the RL relay 518 to indicate that the originating register may be released. After completing the originating connection to the calling line the marker causes the operation of the MRL relay 706 of the originating register which operates to initiate the release of the marker connector and of the marker.

As a further example of a call involving a 11X code, it will be assumed that the subscriber dials a code involving the digits 1, 1 and 3 and that therefore the IID relay 600 and the A1 and A2 relays 612 and 613 of the A digit register 610 are operated. As a consequence relay 612 establishes a circuit from ground over its lower contacts and conductor 653 through the winding of the TA1 relay 302 to battery and relay 613 establishes a circuit from ground over its lower contacts and conductor 650 through the winding of the TA2 relay 303 to battery thereby registering the A code digit in the A digit translator as 3. The IID relay 600 also establishes a circuit from the G punching strapped to the IIC punching of Fig. 3, over conductor 651, the lower No. 2 contacts of relay 600, and conductor 652 to the IID punching strapped to the winding of the TAB relay 307 thereby causing the operation of the latter relay. It will be assumed that the directing code is for a call to a line of another exchange area to which four digits and possibly a fifth digit must be transmitted to establish the desired connection and that therefore the MST relay 700 should not be operated to call in a marker until a fifth digit has been registered by the relays of the E digit register 930. For this purpose the punching AC3 at the left of Fig. 3 is cross-connected over conductor 312 of cable 309 to the E punching at the right of Fig. 12.

In the manner previously described the several dialed digit series are received and at the end of the fourth digit series following the 11X code digits, when the RA relay 802 releases and the RA1 relay 803 reoperates, the FS relay 1203 will be operated and apply ground over its lower No. 6 contacts to punching E, thence over conductor 312 of cable 309 to punching AC3, the upper No. 2 contacts of the TA1 relay 302, the upper No. 3 contacts of the TA2 relay 303 and over the upper No. 3 contacts of the TAB relay 307 to punching AD3. Since the register does not know whether another digit such as a party station digit is to be dialed, it must wait for such a possible digit before calling in a marker to complete the connection. For this purpose the AD3 punching is strapped over conductor 308 of cable 309 to the DL punching of Fig. 12 which is connected over conductor 1215, the upper No. 3 front contact of the RA1 relay 803, conductor 829, the lower back contact of the DL1 relay 719, the lower No. 3 back contact of the DT relay 720 and through the winding of the DL relay 721 to battery. As soon as the RA1 relay 803 reoperates at the end of the fourth digit series following the 11X code, relay 721 will operate.

Relay 721 upon operating opens the discharge path for condenser 722 extending through resistor 723 and over the upper No. 2 back contact of relay 721, and establishes a charging path for condenser 722 which may be traced from battery through resistor 724, over its upper No. 1 contacts, the upper back contact of the DL1 relay 719, through resistors 725 and 723, condenser 722, conductor 726 and to ground over the lower No. 1 contacts of the ON1 relay 523. Relay 721 also establishes a holding circuit for itself extending from battery through its winding, the lower No. 3 back contact of the DT relay 720, through the winding of the DL1 relay 719 and over the lower contacts of relay 721 to ground on conductor 1215, but the winding of relay 719 being shunted over its lower back contact to ground applied to conductor 829, so long as the RA1 relay 803 remains operated, does not operate in this locking circuit. If the RA1 relay 803 remains operated for three to five seconds indicative of the fact that the subscriber has not dialed another digit, the voltage across condenser 722 will reach a high enough value to cause the tube 727 to break down across its control gap between the cathodes 728 and 729 and to thereby establish a circuit for the DT relay 720 from the positive potential source through resistor 724, over the upper No. 1 contacts of relay 721, the upper back contact of relay 719, across the main gap of tube 727 between the cathode 729 and the anode 730, through the winding of the DT relay 720 and to ground on conductor 726, whereupon relay 720 operates and locks over its upper contacts and through resistors 731 and 724 to the source of positive potential.

Relay 720 upon operating opens the initial operating and the locking circuits of relay 721 which relay then releases to deionize the tube 727 and to transfer condenser 722 from its charging path to its discharging path. Relay 720 also at its lower No. 2 contacts connects ground over conductor 732, the inner upper front contact of the CN relay 102, the inner upper back contact of the GT1 relay 109, and through the winding of the CNT relay 106 to battery. Relay 106 operates to initiate the coin test and if a coin has been deposited the GT1 relay 109 is operated in the manner previously described and causes the operation of the MST relay 700 to seize a marker. The call then proceeds in the manner described for the preceding call.

If the subscriber does dial a digit before the timing interval is completed the RA1 relay 803 releases, removing ground from conductor 829 thereby removing the shunt of the DL1 relay 719 which operates in the locking circuit of the DL relay 721 and terminates the timing by removing the positive source of potential from connection with the condenser 722 and opens the circuit from its winding to conductor 829 so that it will not be shunted down when the RA1 relay 803 reoperates. Relay 719 also connects ground from conductor 1215 over the upper contacts of the RA1 relay 803, conductor 829, the lower contacts of relay 719 and to conductor 732 to cause the initiation of the coin test, the operation of relay 700 if a coin is found to have been deposited and the seizure of a marker as previously described.

Other calls

The calling subscriber may dial the number of a line terminating, for example, in an office of the local exchange area. In such case, the IID relay 600 will not be operated but relays of the A digit translator of Fig. 3 will be operated in accordance with the A digit dialed. It will be assumed that the A digit dialed has the numerical value 9 and that therefore the A2 and A7 relays 613 and 615 of the A digit register 610 are operated, resulting in the establishment of circuits over conductors 650 and 654 for the TA2 relay 303 and the TA7 relay 305 which operate. Since the IID relay 600 is not operated, a circuit is established from ground at punching G of Fig. 3 over conductor 313, the lower No. 2 contacts of the P2A relay 1100, which will be operated since the dialed A digit was greater than 1, conductor 1113, the lower No. 1 back contact of relay 600, conductor 655, punching IIB connected to the winding of the TAA relay 306 and through the winding of such relay to battery. Relay 306 is thus operated. It will be assumed that the A digit dialed being 9 signifies a seven-digit number and that for that purpose the AA9 punching at the left of Fig. 3 is connected over conductor 314 of cable 309 to the G punching at the right of Fig. 12 and the AB9 punching at the right of Fig. 3 is cross-connected over conductor 311 with the MST punching of Fig. 4.

In the manner previously described, the several dialed digit series are received and at the end of the seventh digit series when the RA relay 302 releases and the RA1 relay 803 reoperates, and, the GS relay 1207 being operated supplies ground over the lower No. 3 contact of relay 803, conductor 824, upper contact 1 of the EV relay 1208, lower No. 4 contact of the GS relay 1207, punching G, conductor 314 of cable 309 to punching AA9, thence over the lower No. 1 contacts of the TA2 relay 303, the lower No. 2 contacts of the TA7 relay 305, the upper No. 4 contacts of the TAA relay 306, punching AB9, conductor 311, punching MST, conductor 732, the inner upper front contact of the CN relay 102, the inner upper back contact of the GT1 relay 109 and through the winding of the CNT relay 106. Relay 106 operates to initiate the coin test and if a coin has been deposited the GT1 relay 109 is operated in the manner previously described and causes the operation of the MST relay 700 to seize a marker. The call then proceeds in the manner previously described, the disposal of the deposited coin being taken care of from the coin trunk used in establishing the connection.

*Free call*

It may be that the call is one for which no charge should be made as, for example, to a police or fire station. For such calls the route relay in the marker is connected in series with an auxiliary route relay which operates to give the marker information to refund the deposited coin. It will be assumed that the calling subscriber makes such a call and that after a marker has been seized and the digits of the called line number have been transferred from the originating register to the marker registers, schematically represented by the box 1008, the translator 1015 is connected to the marker registers and receives information with respect to the called number. Following the coin test the LT1 relay 236 and the LT2 relay 207 of the register will both be unoperated and consequently the previously traced circuit for the SCK relay 1010 of the marker will be established. With the translator 1015 now operated in accordance with the dialed digits, a circuit is established through the winding of the route relay 1016, over the front contact of relay 1010 and to battery through the winding of the auxiliary route relay 1017. The operation of relay 1017 is indicative of the fact that the call is for a free line and the register should therefore return the deposited coin. Relay 1017 upon operating establishes a circuit from ground over its lower contacts, the lower No. 2 back contact of relay 1014 to battery through the winding of the RRK relay 1011 and over conductor 1018, extended over contacts of the marker connector relays 1001 and 1004 and conductor 245 of cable 250, through the winding of the CR4 relay 238 to battery.

Relays 1011 and 238 both operate. Relay 238, upon operating, locks over its inner lower contacts, the upper No. 3 back contact of the LT1 relay 236 and the upper No. 4 back contact of the LT2 relay 207 to ground on conductor 223, and at its lower contacts establishes a circuit over the upper No. 5 back contact of relay 207 for the CR relay 202 which thereupon operates to initiate the coin return operations. During these operations the CR3 relay 222 operates as previously described and with both relays 222 and 238 now operated, the circuit of the MST relay 700 is opened and such relay releases followed by the release of the MRL relay 706 to prepare for a reseizure of a marker. Either the LT1 relay 236 or the LT2 relay 207 will operate as previously described in response to the coin return operation and will thereby release the CR4 relay 238. The release of relay 238 releases the CR relay 202 which in turn releases the coin return relays as previously described. The release of the CR4 relay 238 recloses at its upper back contact the circuit of the MST relay 700 which reoperates to reengage a marker. Either the lead 242 or 243 will be grounded by the LT1 relay 236 or the LT2 relay 207 to inform the marker now engaged with the originating register the result of the attempt to refund the deposited coin.

When the RRK relay 1011 operated as previously described, it established a circuit from ground on conductor 1007, over the lower contacts and through the winding of the RRC relay 1014 which operated and locked over its lower No. 4 contacts to ground on conductor 1007, established an obvious circuit for the slow-to-operate relay 1019 and opened the initial operating circuit of the RRK relay 1011, but relay 1011 is held operated by the locking ground from the CR4 relay 238 at the register until the coin return functions at the register have been completed. With relay 1011 thus operated, a circuit is established from battery through the windings of the DIS2 and DIS1 relays 1012 and 1013, over the inner lower front contact of relay 1011, the inner lower front contact of the RRC relay 1014, the front contact of relay 1019 and the inner front contact of the auxiliary route relay 1017 to ground and the disconnect relays thereupon operate to initiate the release of the marker. When a marker is seized following the reoperation of the MST relay 700 after the register has performed its coin return functions as just described, the marker will proceed to control the establishment of the connection with the proper trunk.

If the exchange area has manual offices now equipped with call indicator equipment, calls may be completed from the cross bar office on a straightforward basis, that is, the subscriber may dial a one, two or three-digit code which will cause his line to be connected to a trunk to the manual office and, in response to the operator's request, he will then announce the wanted line number to the operator who will then complete the connection.

One way in which such a call may be established is by the assignment of an otherwise unused X11 or 11X service code. In this case the circuits would function as previously described for such code to engage a marker after the service code has been registered. On calls from a coin box line to a straightforward trunk, the register would return the deposited coin before engaging a marker as has been previously described with respect to connections to X11 or 11X service operator's trunks.

A second way in which such a call may be established is through the use of the A digit translator of Fig. 3. For this purpose ground would be connected to an AA punching corresponding to the A digit assigned for such a call and the corresponding AB punching would be connected to the MST1 punching of Fig 3 or to the MST punching of Fig. 4 depending upon whether the deposited coin were to be returned by the register before engaging a marker or whether the coin were not to be returned. As an example, it will be assumed that for such a call the assigned A digit is 4 and that the AA4 punching is therefore connected to ground and the AB4 punching is connected to the MST1 punching.

In response to the dialing of the first or A digit 4, relays 611 and 614 of the A digit register 610 are operated resulting in the connection of ground over their lower contacts to conductors 649 and 656, and the consequent operation of the TA0 and TA4 relays 301 and 304. On such a call the 11D relay 600 would not be operated and therefore the TAA relay 306 would be operated. With relays 301, 304 and 306 operated, a circuit is established from ground connected to punching AA4 over the lower No. 3 contacts of relay 301, the lower No. 4 contacts of relay 304, the lower No. 2 contacts of relay 306, punching MST1, conductor 310, the upper front contact of the CN relay 102, the upper back contact of the GT1 relay 109 and through the winding of the CNT relay 106. Relay 106 thereupon operates to initiate coin test following which the GT1 relay 109 operates if a deposited coin is detected. Following the operation of relay 109 the CR relay 202 is operated to return the coin and at the end of the coin return operations the CN1 relay 206 is released to cause the operation of the MST relay 700 and the seizure of a marker to control the extension of the connection to the manual office. The functions of the circuits to make the coin test, to return the coin and to call in a marker have been fully described hereinbefore.

Vacant code

Should the calling subscriber dial an A code digit which is not a digit of a used office code, the marker is informed that a vacant code has been dialed. This is accomplished by the connection of the punchings at the left of Fig 3 corresponding to such unused A digits to the VC punching and the connection of the corresponding punchings at the right of Fig. 3 to the MST punching of Fig. 4. For example, if there are no office codes having an A digit 7 or 8, the AC7, AC8, AA7 and AA8 punchings would be connected to punching VC and the punching AD7, AD8, AB7 and AB8 would be connected to punching MST. When, therefore, the P2A relay 1100 operates during the counting of the A digit series, a circuit is established from ground over its upper No. 4 contacts, conductor 1114, punching VC, over contacts of operated relays of the A digit translator of Fig. 3 and conductor 311 to punching MST, thence as traced to the winding of the CNT relay 106. Relay 106 thereupon operates to initiate the coin test whereafter the MST relay 700 is operated to cause the seizure of a marker. The call will then be routed to a vacant code trunk.

Release of register by subscriber

If the subscriber abandons the call and replaces his receiver on the switchhook the L relay 800 and the SR relay 805 release. If coin test is in progress the CLR relay 104 will release in turn releasing the CNT2 relay 110 thereby opening the local holding circuit for the L relay 800. The release of relay 805 causes the operation of the CRA relay 200 over the circuit previously described, causing the operation of the CR relay 202 to initiate the coin return operations. The release of the CN1 relay 206 at the end of coin return closes the circuit of the RL relay 518, extending over conductor 530, the lower back contact of relay 206, conductor 246, the lower contacts of the ON1 relay 523, conductor 529 and to ground over the lower back contact of the SR relay 805, and relay 518 operates to release the originating register in the manner previously described.

If a marker has been engaged before the subscriber disconnects, the SR relay 805 will be held over the lead 717 from the marker connector as previously described. The register will therefore not release until the marker functions have been completed. The calling line will be connected to a trunk but the connection will be immediately released.

Register time out

The register timing circuit of Fig. 4 measures times for the important functions of the register to be completed. If the function is completed in the time allowed, the timer resets itself and measures time for the next function. If the function is not completed in the time allowed, the timer times out and causes the register to take the appropriate action. If the timer times out awaiting the dialing of a first digit it engages a marker and requests a connection to a permanent signal trunk. If the timer times out awaiting the dialing of other digits it engages a marker and requests a connection to a partial dial trunk. If it times out awaiting coin disposal on dial tone first calls it causes the release of the register, or if it times out awaiting the release of the register it causes the release of the register.

In each case except the timing out awaiting dialing of other digits, the register will attempt to return the coin in the manner previously described.

The time-out intervals are normally twenty to thirty-five seconds but when the load in the office is heavy, the time intervals may be reduced to ten to seventeen seconds while awaiting the dialing of the first digit and five to eight seconds while awaiting the dialing of other digits. The other time intervals are not reduced during heavy load conditions.

The timer is started to function upon the operation of the ON relay 500 as previously described. As explained previously the P2A relay 1100 operates on the second pulse of the first dialed digit. When this relay operates a circuit is established from battery through the winding of the PD relay 420, over conductor 422, the upper back contact of the MST1 relay 703, the lower No. 1 back contact of the DT relay 720, the upper No. 3 back contact of the DL relay 721 and conductor 1114 to ground over the upper No. 4 contacts of relay 1100. The operation of relay 420 is indicative that the subscriber has started dialing. From the time the register is selected until the PD relay 420 operates the timer measures time. If relay 420 operates before the end of the allotted time interval, it removes a short circuit at its lower No. 3 back contact extending over conductors 201, 512, 403 and 806 from the upper No. 2 contacts of the RA1 relay 803 which allows the latter relay to control the timer start conductor 402 until the end of dialing. At this time relay 803 is unoperated since the pulses for the first digit are being counted so that ground is removed from conductor 402 and the TMA and TMB relays 401 and 400 are released to restart the timer.

If, however, the PD relay 420 does not operate during the allotted time, the TM relay 409 will operate as previously described in turn causing the operation of the TMI relay 421. Relay 421 upon operating locks over its lower contacts and over the lower back contact of relay 420 to ground on conductor 511, establishes a circuit from ground over its lower No. 1 contacts, the lower No. 2 back contact of the PD relay 420, conductor 423, the inner lower front contact of the CNI relay 236 and through the winding of the CRA relay 200 to battery. Relay 200 thereupon operates and at its upper No. 3 back contact removes ground applied over conductor 101 and the lower No. 1 back contact of the CNTI relay 100 from conductor 402 to release the TMB relay 400 and the TMA relay 401 to reset the timer and thereby release the TM relay 409. Relay 200 also causes the operation of the CR relay 202. With relay 202 operated and relay 409 released a circuit is established from battery through the winding of the MSTI relay 703, conductor 705, the upper No. 4 contacts of relay 202, conductor 210, and the lower No. 1 back contact of relay 409 to ground on conductor 511 whereupon relay 703 operates and locks over its upper No. 1 contacts to ground on conductor 511.

With the CR relay 202 operated the coin return operations are performed in the manner previously described, since this is required on permanent signal calls, following which the CNI relay 206 is released and establishes a circuit from ground over the lower No. 1 contacts of relay 421, the lower No. 2 back contact of relay 420, conductor 423, the lower back contact of the CNI relay 206, conductor 247, the lower back contact of the GTI relay 109, the lower back contact of the CNT relay 106, conductor 711, the upper back contact of the CR4 relay 238 and conductor 239 to battery through the winding of the MST relay 700. Relay 700 thereupon operates and functions in the manner previously described to seize a marker. With relay 421 operated and the PD relay 420 unoperated, ground is connected over the upper No. 4 front contact of relay 421 and the upper No. 4 normal contacts of relay 420 and conductor 416 of cable 709 to signal the marker that a permanent signal condition has been encountered and that the marker should route the call to a permanent signal trunk. If the marker cannot set up the call to a permanent signal trunk, it will attempt to connect the calling line to a common overflow trunk. If the marker does not succeed in doing this it will operate the BT relay 701 and the RL relay 518. Relay 518 upon operating releases the register and relay 701 releases the marker in the manner previously discussed.

At the end of each digit the RAI relay 803 operates and at its upper No. 2 contacts closes the operating circuit previously traced over which ground was connected to the timer start conductor 402 thereby causing the TMB and TMA relays 400 and 401 to operate to control the timing cycle and at the beginning of each digit, relay 803 releases to remove ground from conductor 402 to release relays 400 and 401 to reset the timer. After the TMB relay 400 has released, the TMA relay 401 reoperates to restart the timer. Thus the timer is reset and restarted at the beginning of each digit.

If the subscriber dials too few digits, that is, dials partially or dials extremely slowly or the subscriber line is crossed with a power line or other source of continuous pulses, time out will occur and the TM relay 409 will operate and will cause the operation of the TMI relay 421 which will lock over its lower No. 2 contacts to ground over the lower No. 4 front contact of the PD relay 420, which latter relay will be locked over its upper No. 1 contacts and the upper No. 1 contacts of relay 421 to ground on conductor 1114. With relay 421 operated, a circuit is established over its lower No. 1 contacts, the lower No. 2 front contact of relay 420, conductor 424, the lower back contact of the GTI relay 109, the lower back contact of the CNT relay 106, conductor 711, the upper back contact of the CR4 relay 238 and conductor 239 to battery through the winding of the MST relay 700 thereby causing the operation of relay 700 to seize a marker. Relay 421 also connects ground over its upper No. 4 front contact and the upper No. 4 alternate contacts of relay 420 to conductor 417 of cable 709 to signal the marker that it should proceed to connect the subscriber line to a partial dial trunk. The coin if deposited will not be returned by the register because the partial dial trunks are arranged for coin return.

If all the digits are dialed in time, the MSTI relay 703 will be operated as previously described and will open the operating circuit of the PD relay 420 which will release and short circuit at its lower No. 3 back contact the upper No. 2 contacts of the RAI relay 803 so that the latter relay will have no further effect on the timer. When the last digit has been dialed, the upper No. 2 contacts of relay 803 will remain closed so that the TMB relay 400 will be operated and the TMA relay 401 locked to the start conductor 402.

On calls from dial tone first coin lines a coin test is made before the MST relay 700 is operated. In order to make sure that the TMB relay 400 has operated, and its slow-to-release function will give time for the condenser 404 to be discharged, the operating circuit of the CNT2 relay 110 will not be closed until relay 400 operates. When the CNT2 relay 110 operates the CNTI relay 100 also operates to open conductor 402 thus releasing relays 400 and 401 and resetting the timer as previously described.

If a coin is not deposited the TM relay 409 operates in turn causing the TMI relay 421 to operate and with the PD relay 420 now released, a circuit is established from ground over the lower No. 1 contacts of relay 421, the lower No. 2 back contact of relay 420, conductor 423, the inner lower front contact of the CNI relay 206 and through the winding of the CRA relay 200 to battery to cause the coin return circuit to function as previously described. Although coin return is not necessary since the coin test circuit indicated that the coin had not been deposited, coin return is necessary on stuck register time out and the design of the register is simplified by keeping both operations the same.

When the CNI relay 206 releases at the end of the coin return operation, the circuit of the RL relay 518 is established from battery through the winding of such relay, conductors 530 and 716, the lower No. 1 contacts of the MSTI relay 703, the lower No. 2 contacts of the TM relay 409 and conductor 425 to ground at the upper No. 2 back contact of relay 206. Relay 518 now operates to open the tip, ring and sleeve leads thus releasing the dial tone connection and release the L relay 800 and the SR relay 805, opens at the lower back contact of relay 805 one holding circuit for the ON1 relay 523 and locks over its inner lower contacts under the control of the ON relay 500. When the SR relay 805 has released, the ON relay 500 and the ON1 relay 523 both release releasing all other operated relays of the register and thus restoring it to normal.

If a coin is deposited before the expiration of the timing interval the CNT1 relay 100 will release closing the timer control lead 402 at its inner lower No. 1 back contact thereby operating the TMB relay 400 and holding the TMA relay 401 and the operation of the GT1 relay 109 will cause the operation of the MST relay 700 to engage a marker as previously described.

The MST relay 700 may operate as soon as dialing has been completed or may await completion of coin test as previously described or may operate under the control of the TM1 relay 421. In either case the TMB relay 400 will have been operated before the relay 700 either from a contact of the RA1 relay 803 or a contact of the CNT1 relay 100. However, the operating circuit of the relay 700 is wired over the upper contacts of the TMB relay 400 to make sure that the latter relay has operated before relay 700 operates and opens the timer control conductor 402 to reset and restart the timer. In this way the release time of relay 400 assures that the condenser 404 of the timer will be substantially discharged when stuck register timing is started.

If the register is not released, the TM relay 409 operates and, if not already operated due to a previous time-out, the TM1 relay 421 will operate and lock. On coin class calls the operation of relay 421 causes the operation of the CRA relay 100 and the return of the deposited coin. When the coin return operations have been completed the CN1 relay 206 releases closing the previously traced circuit extending over the No. 2 contacts of the TM relay 409 for the RL relay 518 which operates, following which the release of the register is effected as previously described. If the register releases before the completion of the time interval the circuits are restored to normal as described hereinbefore.

When the traffic load on the registers becomes heavy, it is desirable to reduce some of the time-out intervals in order to avoid as far as possible a shortage of registers due to subscriber dialing before dial tone and thus holding the register for long permanent signals or partial dial time-out intervals.

To accomplish this, the group-busy circuit establishes a circuit over the upper No. 2 back contact of the MST1 relay 703, conductor 733 and through the winding of the OVL relay 408 to battery. Relay 408, upon operating, replaces the resistor 407 through which the condenser 404 of the timer usually charges, by either of two resistors 426 or 427, dependent upon whether the PD relay 420 is operated or is not operated. This changes the time-out interval while waiting the dialing of the first digit (relay 420 unoperated) from twenty to thirty-five seconds to ten to seventeen seconds and changes the partial dial interval when relay 420 is operated to five to eight seconds. When the MST1 relay 703 operates at the end of dialing, the OVL relay 408 releases so that the interval while awaiting coin deposit or on dial tone first lines, and release of the register is maintained at twenty to thirty-five seconds.

What is claimed is:

1. In a telephone system, subscriber lines equipped with coin boxes, originating registers, means to establish a connection to an idle one of said originating registers in response to the initiation of a call from one of said lines, a switch controlling marker, means in said register operated over said calling line for registering the digits of a wanted line designation, means normally responsive to the operation of said registering means to connect said register with said marker and to transfer said designation to said marker, coin return means in said register, and means in said register to initiate the operation of said coin return means controlled by said register or by said marker in accordance with said registered designation.

2. In a telephone system, subscriber lines equipped with coin boxes, originating registers, means to establish a connection to an idle one of said originating registers in response to the initiation of a call from one of said lines, a switch controlling marker, means in said register operated over said calling line for registering the digits of a wanted line designation, means in said register effective if the registration of a line designation is indicative of a call to an operator's position to control the return of a deposited coin, and means thereafter effective to connect said register with said marker and to transfer said designation to said marker.

3. In a telephone system, subscriber lines equipped with coin boxes, originating registers, means to establish a connection to an idle one of said originating registers in response to the initiation of a call from one of said lines, a switch controlling marker, means in said register operated over said calling line for registering the digits of a wanted line designation, means in said register for testing to determine if a coin has been deposited in the coin box of the calling line, means in said register effective if the registration of a call designation is indicative of a call to an operator's position and said testing means finds that a coin has been deposited to control the return of the deposited coin, and means thereafter effective to connect said register with said marker and to transfer said designation to said marker.

4. In a telephone system, subscriber lines equipped with coin boxes, originating registers, means to establish a connection to an idle one of said originating registers in response to the initiation of a call from one of said lines, a switch controlling marker, means in said register operated over said calling line for registering the digits of a wanted line designation, means in said register for testing to determine if a coin has been deposited in the coin box of the calling line, means in said register operable to control the return of a coin if deposited, means operable if the registration of a call designation is indicative of a call to a zero operator's position for cancelling the operation of said coin test means and for causing the operation of said coin return means, and means thereafter effective to connect said register with said marker and to transfer said designation to said marker.

5. In a telephone system, subscriber lines equipped with coin boxes, originating registers, means to establish a connection to an idle one of said originating registers in response to the initiation of a call from one of said lines, a switch controlling marker, means in said register operated over said calling line for registering the digits of a wanted line designation, means in said register effective if the registration of a line designation is indicative of a call to an operator's position to control the return of a deposited coin, means thereafter effective to connect said register with said marker and to transfer said designation to said marker, means in said marker to indicate the last digit registered and means in said register to operate said indicating means.

6. In a telephone system, subscriber lines equipped with coin boxes, originating registers, means to establish a connection to an idle one of said originating registers in response to the initiation of a call from one of said lines, a switch controlling marker, pulse counting relays in said register operative to count the pulses of each digit of a wanted line designation dialed by a subscriber, registering means responsive to said relays for registering the digits of a dialed line designation, means in said register operable to control the return of a deposited coin in response to said counting relays if said relays are operated to count a first digit of ten pulses, and means thereafter effective to connect said register with said marker and to transfer said registered digit to said marker.

7. In a telephone system, subscriber lines of one class equipped with coin boxes, subscriber lines of other classes, originating registers, means to establish a connection to an idle one of said originating registers in response to the initiation of a call from one of said lines, a switch controlling marker, means in said register for registering the class of a calling line, means in said register responsive to the dialing of a wanted line designation for registering the digits of said designation, means responsive to the registration of said designation to connect said register with said marker and to transfer said designation to said marker immediately following the completion of the registration if the operated class registering means indicates that the call originated on a line of said other classes, coin return means in said register, means to initiate the operation of said coin return means if the operated class registering means indicates that the call originated on a line of the coin box class and the registration of a line designation is indicative of a call to an operator's position, and means responsive to the operation of said coin return means to render said marker connecting means and said designation transfer means effective.

8. In a telephone system, subscriber lines of one class equipped with coin boxes, subscriber lines of other classes, originating registers, means to establish a connection to an idle one of said originating registers in response to the initiation of a call from one of said lines, a switch controlling marker, means in said register for registering the class of a calling line, means in said register operated over said calling line for registering the digits of a wanted line designation, means effective immediately following the completion of registration of the wanted line designation irrespective of the registered class of the calling line to connect said register with said marker and to transfer said registration to said marker if said registered designation is not indicative of a call to an operator position, coin return means in said register, and means controlled by said class registering means to cause the connection of said register to said marker either immediately following the completion of registration or following the operation of said coin return means if said registered designation is indicative of a call to an operator's position.

9. In a telephone system, subscriber lines equipped with coin boxes, originating registers, means to establish a connection to an idle one of said originating registers in response to the initiation of a call from one of said lines, a switch controlling marker, means in said register operated over said calling line for registering the digits of a wanted line designation, means in said register for testing to determine if a coin has been deposited in the coin box of the calling line, means in said register effective if a three-digit code indicative of a call to a service operator's position is registered and said testing means finds that a coin has been deposited to control the return of the deposited coin, and means thereafter effective to connect said register with said marker and to transfer said designation to said marker.

10. In a telephone system, subscriber lines equipped with coin boxes, originating registers, means to establish a connection to an idle one of said originating registers in response to the initiation of a call from one of said lines, a switch controlling marker, means in said register operated over said calling line for registering the digits of said designation, means in said register for testing to determine if a coin has been deposited in the coin box of the calling line, relay means responsive to said designation registering means if said latter means is set to register a first digit of any value followed by a second digit "one" and then followed by a third digit "one," and operable to control said testing means, means in said register operative to return a coin if said testing means determines that a coin has been deposited, and means operative following the return of the deposited coin to connect said register with said marker and to transfer said designation to said marker.

11. In a telephone system, subscriber lines equipped with coin boxes, originating registers, means to establish a connection to an idle one of said originating registers in response to the initiation of a call from one of said lines, a switch controlling marker, means in said register operated over said calling line for registering the digits of a wanted line designation, means in said register for testing to determine if a coin has been deposited in the coin box of the calling line, means operable to absorb a first and a second digit "one" whereby a third digit is registered in said registering means, means jointly controlled by said digit absorbing means and said registering means to control said testing means, means in said register operative to return a coin if said testing means determines that a coin has been deposited, and means operative following the return of the deposited coin to connect said register with said marker and to transfer said designation to said marker.

12. In a telephone system, subscriber lines equipped with coin boxes, originating registers, means to establish a connection to an idle one of said originating registers in response to the initiation of a call from one of said lines, a switch controlling marker, pulse counting relays in said register operative to count the pulses of each digit of a wanted line designation dialed by a subscriber, registering means responsive to said relays for registering the digits of a dialed line designation, means in said register for testing to determine if a coin has been deposited in the coin box of the calling line, means responsive to said pulse counting relays to absorb a first and a second digit "one" whereby a third digit is registered by said registering means, means jointly controlled by said digit absorbing means and said registering means to control said testing means, means in said register operable to return a coin if said testing means determines that a coin has been deposited, and means operative following the return of the deposited coin to connect said register with said marker and to transfer said designation to said marker.

13. In a telephone system, subscriber lines equipped with coin boxes, originating registers, means to establish a connection to an idle one of said originating registers in response to the initiation of a call from one of said lines, a switch controlling marker, means in said register operated over said calling line for registering the digits of a wanted line designation, means in said register for testing to determine if a coin has been deposited in the coin box of the calling line, relay means operable to absorb a first and a second digit "one" whereby subsequent digits are registered in said registering means, means jointly controlled by said digit absorbing means and said registering means to control said testing means, means in said register operative under the control of said latter means if said coin testing means determines that a coin has been deposited to connect said register with said marker and to transfer said designation to said marker, coin deposited indicating means in said marker and means in said register to operate said indicating means.

14. In a telephone system, subscriber lines equipped with coin boxes, originating registers, means to establish a connection to an idle one of said originating registers in response to the initiation of a call from one of said lines, a switch controlling marker, means in said register responsive to the dialing of a wanted line designation, means under the control of said responsive means for registering the digits of said designation, means in said register for testing to determine if a coin has been deposited in the coin box of the calling line, means operable to absorb a first and a second digit "one" if dialed whereby subsequent dialed digits are registered in said registering means, means jointly controlled by said digit absorbing means and said registering means if the first digit dialed is of a particular value to measure a time interval to await the dialing of an additional digit, means operative at the end of said time interval or upon the completion of dialing an extra digit to control said testing means, means in said register operative under the control of said latter means if said testing means determines that a coin has been deposited to connect said register with said marker and to transfer said designation to said marker, coin deposited indicating means in said marker and means in said register to operate said indicating means.

15. In a telephone system, subscriber lines equipped with coin boxes, originating registers, means to establish a connection to an idle one of said originating registers in response to the initiation of a call from one of said lines, a switch controlling marker, means in said register operated over said calling line to register the digits of a wanted line designation, means in said register for testing to determine if a coin has been deposited in the coin box of the calling line, means operable in response to the completion of the registration of a wanted line designation to control said testing means, means in said register operative under the control of said testing means if said testing means determines that a coin has been deposited to connect said register with said marker and to transfer said designation to said marker, means in said register to control the return of the deposited coin and means in said marker operative if the designation transferred to said marker is indicative of a line to which free calls are allowed to operate said coin return means to return the deposited coin.

16. In a telephone system, subscriber lines equipped with coin boxes, originating registers, means to establish a connection to an idle one of said originating registers in response to the initiation of a call from one of said lines, a switch controlling marker, means in said register operated over said calling line to register the digits of a wanted line designation, means in said register for testing to determine if a coin has been deposited in the coin box of the calling line, means effective if said testing means determines that a coin has been deposited to connect said register to said marker and to transfer said designation to said marker, a source of tone current and means effective if said testing means determines that a coin has not been deposited to render said connecting means ineffective and to cause the application of tone current from said source to said line.

17. In a telephone system, subscriber lines equipped with coin boxes, originating registers, means to establish a connection to an idle one of said originating registers in response to the initiation of a call from one of said lines, a switch controlling marker, means in said register operated over said calling line to register the digits of a wanted line designation, means in said register for testing to determine if a coin has been deposited in the coin box of the calling line, means effective if said testing means determines that a coin has been deposited to connect said register to said marker and to transfer said designation to said marker, a source of tone current, means operative to measure a time interval from the start of the operation of said testing means, and means effective at the end of said time interval if said testing means determines that a coin has not been deposited to render said connecting means ineffective and to cause the application of tone current from said source to said line.

18. In a telephone system, subscriber lines equipped with coin boxes, originating registers, means to establish a connection to an idle one of said originating registers in response to the initiation of a call from one of said lines, a switch controlling marker, means in said register operated over said calling line to register the digits of a wanted line designation, means for controlling the return of a coin deposited in the coin box of the calling line, means for measuring a time interval sufficient to insure the return of the deposited coin, testing means thereafter effective to determine whether the coin has been returned or is stuck in the coin mechanism, means responsive to said testing means to connect said register to said marker and to transfer said designation to said marker, coin returned indicating means in said marker, stuck coin indicating means in said marker, and means in said register operative in response to said testing means to selectively operate either said coin returned indicating means or said stuck coin indicating means.

19. In a telephone system, subscriber lines equipped with coin boxes, originating registers, means to establish a connection to an idle one of said originating registers in response to the initiation of a call from one of said lines, a switch controlling marker, means in said register operated over said calling line to register the digits of a wanted line designation, means for controlling the return of a coin deposited in the coin box of the calling line, means for measuring a time interval sufficient to insure the return of a deposited coin, testing means thereafter effective to determine whether the coin has been returned or is stuck, means effective upon the initiation of testing to measure a further time interval, means operative at the end of said latter interval in response to said testing means to register whether a deposited coin has been returned or is stuck, means responsive to said latter means to connect said register to said marker and to transfer said designation to said marker, coin returned indicating means in said marker, stuck coin indicating means in said marker, and means in said register operative in response to said testing means to selectively operate either said coin returned indicating means or said stuck coin indicating means.

20. In a telephone system, subscriber lines equipped with coin boxes, originating registers, means to establish a connection to an idle one of said originating registers in response to the initiation of a call from one of said lines, means in said register for controlling the return of a deposited coin, means operative if the subscriber abandons the call while said register is connected to the calling line for operating said coin return means to return the deposited coin, and means thereafter effective to release said register and the connection from said line to said register.

21. In a telephone system in which certain subscriber lines are equipped with coin boxes and in which a connection is established to an idle originating register in response to the initiation of a call from one of said lines, an originating register, a switch controlling marker, means in said register operated over said calling line to register the digits of a wanted line designation, means in said register for controlling the return of the coin deposited in the coin box of the calling line, means for measuring a time interval during which a first digit should be registered in the register, means operative if a first digit is not registered before the end of said measured interval to operate said coin return means to return the deposited coin, means operative upon the return of said coin to connect said register with said marker, a permanent signal relay in said marker, and means in said register for operating said permanent signal relay.

22. In a telephone system, subscriber lines equipped with coin boxes, originating registers, means to establish a connection to an idle one of said originating registers in response to the initiation of a call from one of said lines, a switch controlling marker, means in said register operated over said calling line to register the digits of a wanted line designation, means in said register operative following the completion of dialing for controlling the return of a deposited coin, means for measuring a time interval following the initiation of coin return during which said register should become released, and means operative at the end of said measured interval if said register has not released to cause the release of said register and the connection from said line to said register.

23. In a telephone system, subscriber lines equipped with coin boxes, originating registers, means to establish a connection to an idle one of said originating registers in response to the initiation of a call from one of said lines, a switch controlling marker, means in said register operated over said calling line to register the digits of a wanted line designation, means in said register for controlling the return of a coin deposited in the coin box of the calling line, means for measuring the time interval during which a first digit should be dialed into the register, means operative if the first digit is not dialed before the end of said measured interval to operate said coin return means to return the deposited coin, means effective to shorten said time interval during periods of heavy traffic, and means operative upon the return of said coin to connect said register with said marker, a permanent signal relay in said marker, and means in said register for operating said permanent signal relay.

24. In a telephone system, subscriber lines equipped with coin boxes, originating registers, means to establish a connection to an idle one of said originating registers in response to the initiation of a call from one of said lines, a switch controlling marker, means in said register operated over said calling line to register the digits of a wanted line designation, means in said register for testing to determine if a coin has been deposited in the coin box of the calling line, means operable in response to the completion of the registration of a wanted line designation to control said testing means, means in said register operative under the control of said testing means, if said testing means determines that a coin has been deposited, to connect said register with said marker and to transfer said designation to said marker, means in said register to control the return of the deposited coin, means in said marker operative if the designation transferred to said marker is indicative of a line to which free calls are allowed to operate said coin return means to return the deposited coin and cause said register to release said connecting means, and means responsive to the operation of said coin return means to reoperate said connecting means to again transfer said designation to said marker and to indicate to said marker that the coin has been returned.

25. In a telephone system, subscriber lines equipped with coin boxes, originating registers, means to establish a connection to an idle one of said originating registers in response to the initiation of a call from one of said lines, a switch controlling marker, means in said register operated over said calling line to register the digits of a wanted line designation, means in said register for testing to determine if a coin has been deposited in the coin box of the calling line, means operable in response to the completion of the registration of a wanted line designation to control said testing means, means in said register operative under the control of said testing means, if said testing means determines that a coin has been deposited, to connect said register with said marker and to transfer said designation to said marker, means in said register to control the return of the deposited coin, means in said marker operative if the designation transferred to said marker is indicative of a line to which free calls are allowed to operate said coin return means to return the deposited coin and cause said register to release said connecting means, means responsive to the operation of said coin return means to reoperate said connecting means to again transfer said designation to said marker and to indicate to said marker that the coin has been returned, and means in said marker responsive to said coin returned indication to prevent the reoperation of said coin return means and said connector release means.

JOSEPH W. DEHN.

REFERENCES CITED

The following references are of record in the file of this patent:

UNITED STATES PATENTS

| Number | Name | Date |
|---|---|---|
| 2,093,117 | Carpenter | Sept. 14, 1937 |
| 2,106,360 | Raymond | Jan. 25, 1938 |
| 2,170,403 | Goddard | Aug. 22, 1939 |
| 2,344,634 | Powell | Mar. 21, 1944 |
| 2,367,769 | Goddard | Jan. 23, 1945 |
| 2,370,239 | Friend | Feb. 27, 1945 |
| 2,427,000 | Hovland | Sept. 9, 1947 |